US012764690B2

(12) United States Patent
Kumar

(10) Patent No.: US 12,764,690 B2
(45) **Date of Patent: *Oct. 13, 2026**

(54) DYNAMIC ADDITIONAL DEMODULATION REFERENCE SIGNAL CONFIGURATION

(71) Applicant: Dell Products L.P., Round Rock, TX (US)

(72) Inventor: Sunil Kumar, Bangalore (IN)

(73) Assignee: Dell Products L.P., Round Rock, TX (US)

(*) Notice: Subject to any disclaimer, the term of this patent is extended or adjusted under 35 U.S.C. 154(b) by 738 days.

This patent is subject to a terminal disclaimer.

(21) Appl. No.: 18/068,261

(22) Filed: Dec. 19, 2022

(65) Prior Publication Data

US 2024/0205864 A1 Jun. 20, 2024

(51) Int. Cl.

*H04W 60/00* (2009.01)
*H04L 5/00* (2006.01)
*H04W 60/04* (2009.01)

(52) U.S. Cl.

CPC ........... *H04W 60/04* (2013.01); *H04L 5/0051* (2013.01)

(58) Field of Classification Search

None

See application file for complete search history.

(56) References Cited

U.S. PATENT DOCUMENTS

| | | | | |
|---|---|---|---|---|
| 11,336,419 | B2 * | 5/2022 | Wang | H04L 5/0092 |
| 12,323,356 | B2 | 6/2025 | Kumar et al. | |
| 2015/0304080 | A1 | 10/2015 | Yi et al. | |
| 2016/0127932 | A1 | 5/2016 | Cosimini et al. | |

(Continued)

FOREIGN PATENT DOCUMENTS

| | | |
|---|---|---|
| WO | 2018229955 | 12/2018 |
| WO | 2019/032296 | 2/2019 |

(Continued)

OTHER PUBLICATIONS

Kumar et al. "Dynamic Additional Demodulation Reference Signal Configuration" U.S. Appl. No. 17/812,261, filed Jul. 13, 2022, 64 pages.

(Continued)

*Primary Examiner* — Gerald A Smarth
(74) *Attorney, Agent, or Firm* — Amin, Turocy & Watson, LLP

(57) ABSTRACT

A system can configure a first number of demodulation reference signal (DMRS) positions in radio resource control information as part of a connection setup with a user equipment that is configured to facilitate broadband cellular communications, wherein the broadband cellular communications are facilitated with carrier aggregation of a primary cell and a secondary cell. The system can, after attaching to the user equipment, send a first message to the user equipment indicative of modifying the first number of DMRS positions to a second number of demodulation reference signal positions for first communications via the primary cell. The system can send a second message to the user equipment indicative of modifying the DMRS positions for second communications via the secondary cell. The system can conduct the broadband cellular communications with the user equipment according to the second number of DMRS positions.

20 Claims, 20 Drawing Sheets

(56) References Cited

U.S. PATENT DOCUMENTS

| | | | |
|---|---|---|---|
| 2016/0212737 A1 | 7/2016 | Jang et al. | |
| 2018/0270103 A1 | 9/2018 | Chapman et al. | |
| 2019/0223176 A1 | 7/2019 | Liu et al. | |
| 2019/0349023 A1 | 11/2019 | Ge et al. | |
| 2020/0052802 A1 | 2/2020 | Ryu et al. | |
| 2020/0053724 A1* | 2/2020 | MolavianJazi | H04W 52/146 |
| 2020/0229185 A1 | 7/2020 | Zhang et al. | |
| 2020/0314960 A1 | 10/2020 | Basu Mallick et al. | |
| 2020/0328861 A1 | 10/2020 | Malladi et al. | |
| 2021/0075571 A1 | 3/2021 | Manolakos et al. | |
| 2021/0153171 A1 | 5/2021 | Saito et al. | |
| 2021/0250753 A1 | 8/2021 | Hosseini et al. | |
| 2022/0078872 A1 | 3/2022 | Shrestha et al. | |
| 2022/0123853 A1 | 4/2022 | Chandran et al. | |
| 2022/0159757 A1 | 5/2022 | Balasubramanian et al. | |
| 2022/0166566 A1 | 5/2022 | Kumar et al. | |
| 2022/0286253 A1 | 9/2022 | Chae et al. | |
| 2023/0006762 A1 | 1/2023 | Levitsky et al. | |
| 2023/0139332 A1* | 5/2023 | Dinan | H04W 72/20 370/329 |
| 2023/0164702 A1 | 5/2023 | Lee et al. | |
| 2023/0216711 A1 | 7/2023 | Yao et al. | |
| 2023/0353306 A1 | 11/2023 | Ren et al. | |
| 2023/0371030 A1 | 11/2023 | Wang et al. | |
| 2023/0379926 A1 | 11/2023 | Pardhasarathy et al. | |
| 2023/0379927 A1 | 11/2023 | Agarwal et al. | |
| 2023/0379930 A1 | 11/2023 | Chacko et al. | |
| 2024/0187182 A1 | 6/2024 | Shukla | |

FOREIGN PATENT DOCUMENTS

| | | |
|---|---|---|
| WO | 2021/243481 | 12/2021 |
| WO | 2022/031919 | 2/2022 |
| WO | 2023/048330 | 3/2023 |

OTHER PUBLICATIONS

Kumar et al. "Dynamic Additional Demodulation Reference Signal Configuration" U.S. Appl. No. 17/812,271, filed Jul. 13, 2022, 62 pages.

Kumar et al. "Dynamic Additional Demodulation Reference Signal Configuration" U.S. Appl. No. 17/812,265, filed Jul. 13, 2022, 62 pages.

Kumar et al. "Dynamic Additional Demodulation Reference Signal Configuration" U.S. Appl. No. 17/812,262, filed Jul. 13, 2022, 62 pages.

Kumar, Sunil. "Dynamic Additional Demodulation Reference Signal Configuration" U.S. Appl. No. 18/063,347, filed Dec. 8, 2022, 74 pages.

Kumar, Sunil. "Dynamic Additional Demodulation Reference Signal Configuration" U.S. Appl. No. 18/063,357, filed Dec. 8, 2022, 73 pages.

Kumar, Sunil. "Dynamic Additional Demodulation Reference Signal Configuration" U.S. Appl. No. 18/068,737, filed Dec. 20, 2022, 68 pages.

Office Action mailed Aug. 15, 2024 for U.S. Appl. No. 17/812,261, 53 pages, Jul. 6, 2025.

Office Action mailed Oct. 24, 2024 for U.S. Appl. No. 17/812,265, 46 pages.

Notice of Allowance mailed May 5, 2025 for U.S. Appl. No. 18/068,737, 40 pages.

Office Action mailed Mar. 24, 2025 for U.S. Appl. No. 18/063,347, 43 pages.

Office Action mailed Apr. 3, 2025 for U.S. Appl. No. 18/063,357, 66 pages.

Notice of Allowance mailed Feb. 26, 2025 for U.S. Appl. No. 17/812,262, 22 pages.

Office Action mailed Apr. 10, 2025 for U.S. Appl. No. 17/812,271, 35 pages.

International Search Report and Written Opinion mailed Apr. 19, 2024 for PCT Application No. PCT/US2023/035945, 17 pages.

Moderator (Huawei): "Summary#I of efficient SCe11 activation/de-activation mechanism of NR CA", 3GPP Draft; R1-2103886, RAN WG1, No. E-meeting; Apr. 20, 2021, [https://ftp.3gpp.org/tsg_ran/WG1_RL1/TSGR1_104b-e/Inbox/R1-2103886.zip RI-2103886 Sumni-ary#2 of SCe11 activation of NR CA.docx], 43 pages.

International Search Report and Written Opinion mailed Feb. 13, 2024 for PCT Application No. PCT/US2023/035946, 14 pages.

International Search Report and Written Opinion mailed Feb. 26, 2024 for PCT Application No. PCT/US2023/035950, 19 pages.

International Search Report and Written Opinion mailed Mar. 1, 2024 for PCT Application No. PCT/US2023/036165, 19 pages.

Final Office Action mailed Feb. 18, 2025 for U.S. Appl. No. 17/812,261, 50 pages.

Office Action mailed Nov. 19, 2024 for U.S. Appl. No. 17/812,262, 44 pages.

Notice of Allowance mailed Aug. 19, 2025 for U.S. Appl. No. 17/812,271, 37 pages.

Office Action mailed Sep. 24, 2025 for U.S. Appl. No. 17/812,265, 162 pages.

Office Action mailed Oct. 28, 2025 for U.S. Appl. No. 18/063,357, 82 pages.

Notification concerning transmittal of International Preliminary Report on Patentability mailed Jul. 3, 2025 for PCT Application No. PCT/US2023/035950, 14 pages.

European Office Action mailed Jul. 29, 2025 for European Patent Application No. 23813122.1, 3 pages.

Notification concerning transmittal of International Preliminary Report on Patentability mailed Jun. 19, 2025 for PCT Application No. PCT/US2023/035945, 10 pages.

European Office Action mailed Jul. 15, 2025 for European Patent Application No. 23813121.3, 3 pages.

Notification concerning transmittal of International Preliminary Report on Patentability mailed Jun. 19, 2025 for PCT Application No. PCT/US2023/035946, 9 pages.

European Office Action mailed Jul. 15, 2025 for European Patent Application No. 2309824.8, 3 pages.

Notice of Allowance mailed May 13, 2025 for U.S. Appl. No. 17/812,261, 34 pages.

Notice of Allowance mailed Jul. 29, 2025 for U.S. Appl. No. 18/063,347, 24 pages.

Notification concerning transmittal of International Preliminary Report on Patentability mailed Jul. 3, 2025 for PCT Application No. PCT/US2023/036165, 14 pages.

European Office Action mailed Jul. 29, 2025 for European Patent Application No. 23813147.8, 3 pages.

Notice of Allowance mailed Dec. 18, 2025 for U.S. Appl. No. 17/812,265, 365 pages.

Notice of Allowance mailed Feb. 10, 2026 for U.S. Appl. No. 18/063,357, 24 pages.

* cited by examiner

100

```
-- ASN1START
-- TAG-DMRS-DOWNLINKCONFIG-START

DMRS-DownlinkConfig ::=           SEQUENCE {
    dmrs-Type                         ENUMERATED {type2}                     OPTIONAL,   -- Need S
    dmrs-AdditionalPosition           ENUMERATED {pos0, pos1, pos3}          OPTIONAL,   -- Need S
    maxLength                         ENUMERATED {len2}                      OPTIONAL,   -- Need S
    scramblingID0                     INTEGER (0..65535)                     OPTIONAL,   -- Need S
    scramblingID1                     INTEGER (0..65535)                     OPTIONAL,   -- Need S
    phaseTrackingRS                   SetupRelease { PTRS-DownlinkConfig  } OPTIONAL,   -- Need M
    ...,
    [[
    dmrs-Downlink-r16               ENUMERATED {enabled}                   OPTIONAL    -- Need R
    ]]

}

-- TAG-DMRS-DOWNLINKCONFIG-STOP
-- ASN1STOP
```

102

FIG. 1

200

```
-- ASN1START
-- TAG-DMRS-UPLINKCONFIG-START

DMRS-UplinkConfig ::=                 SEQUENCE {
    dmrs-Type                             ENUMERATED {type2}                      OPTIONAL,   -- Need S
    dmrs-AdditionalPosition               ENUMERATED {pos0, pos1, pos3}           OPTIONAL,   -- Need S
    phaseTrackingRS                       SetupRelease { PTRS-UplinkConfig }      OPTIONAL,   -- Need M
    maxLength                  202        ENUMERATED {len2}                       OPTIONAL,   -- Need S
    transformPrecodingDisabled            SEQUENCE {
        scramblingID0                         INTEGER (0..65535)                  OPTIONAL,   -- Need S
        scramblingID1                         INTEGER (0..65535)                  OPTIONAL,   -- Need S
        ...,
        [[
        dmrs-Uplink-r16                       ENUMERATED {enabled}                OPTIONAL    -- Need R
        ]]
    }                                                                             OPTIONAL,   -- Need R

-- TAG-DMRS-UPINKCONFIG-STOP
-- ASN1STOP
```

FIG. 2

DYNAMIC ADDITIONAL DEMODULATION REFERENCE SIGNAL CONFIGURATION

BACKGROUND

In cellular broadband communications, a user equipment and a core network can communicate to configure a protocol to use in making further communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can configure a first number of demodulation reference signal positions in radio resource control information as part of a connection setup with a base station that is configured to facilitate broadband cellular communications, wherein the broadband cellular communications are facilitated with carrier aggregation of a primary cell and a secondary cell. The system can, after attaching to the base station, receive a first message from the base station indicative of modifying the first number of demodulation reference signal positions to a second number of demodulation reference signal positions for communications via the primary cell. The system can receive a second message from the base station indicative of modifying the first number of demodulation reference signal positions to the second number of demodulation reference signal positions for communications via the secondary cell. The system can conduct the broadband cellular communications with the base station according to the second number of demodulation reference signal positions, wherein a throughput of the broadband cellular communications is determined as a function of a size of a transport block set based on the second number of demodulation reference signal positions.

An example method can comprise, after attaching to a base station that is configured to facilitate broadband cellular communications, receiving, by a system comprising a processor, a first message from the base station indicative of modifying a first number of demodulation reference signal positions that was established as part of a connection setup to a second number of demodulation reference signal positions with respect to a primary cell, wherein the broadband cellular communications are facilitated with carrier aggregation of the primary cell and a secondary cell. The method can further comprise receiving, by the system, a second message from the base station indicative of the first number of demodulation reference signal positions being modified to the second number of demodulation reference signal positions with respect to the secondary cell. The method can further comprise conducting, by the system, the broadband cellular communications with the base station according to the second number of demodulation reference signal positions.

An example non-transitory computer-readable medium can comprise instructions that, in response to execution, cause a system comprising a processor to perform operations. These operations can comprise, after attaching to a base station that is configured to facilitate broadband cellular communications, receiving a first message from the base station indicative of a modified number of demodulation reference signal positions that was established as part of a connection setup with respect to a primary cell, wherein the broadband cellular communications are facilitated with carrier aggregation of the primary cell and a secondary cell. These operations can further comprise receiving a second message from the base station indicative of the modified number of demodulation reference signal positions with respect to the secondary cell. These operations can further comprise conducting the broadband cellular communications with the base station according to the modified number of demodulation reference signal positions.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example demodulation reference signal (DMRS) downlink configuration information element that can facilitate dynamic additional DMRS configuration in accordance with an embodiment of this disclosure;

FIG. 2 illustrates an example DMRS uplink configuration information element that can facilitate dynamic additional DMRS configuration in accordance with an embodiment of this disclosure;

DETAILED DESCRIPTION

Figure 3A:
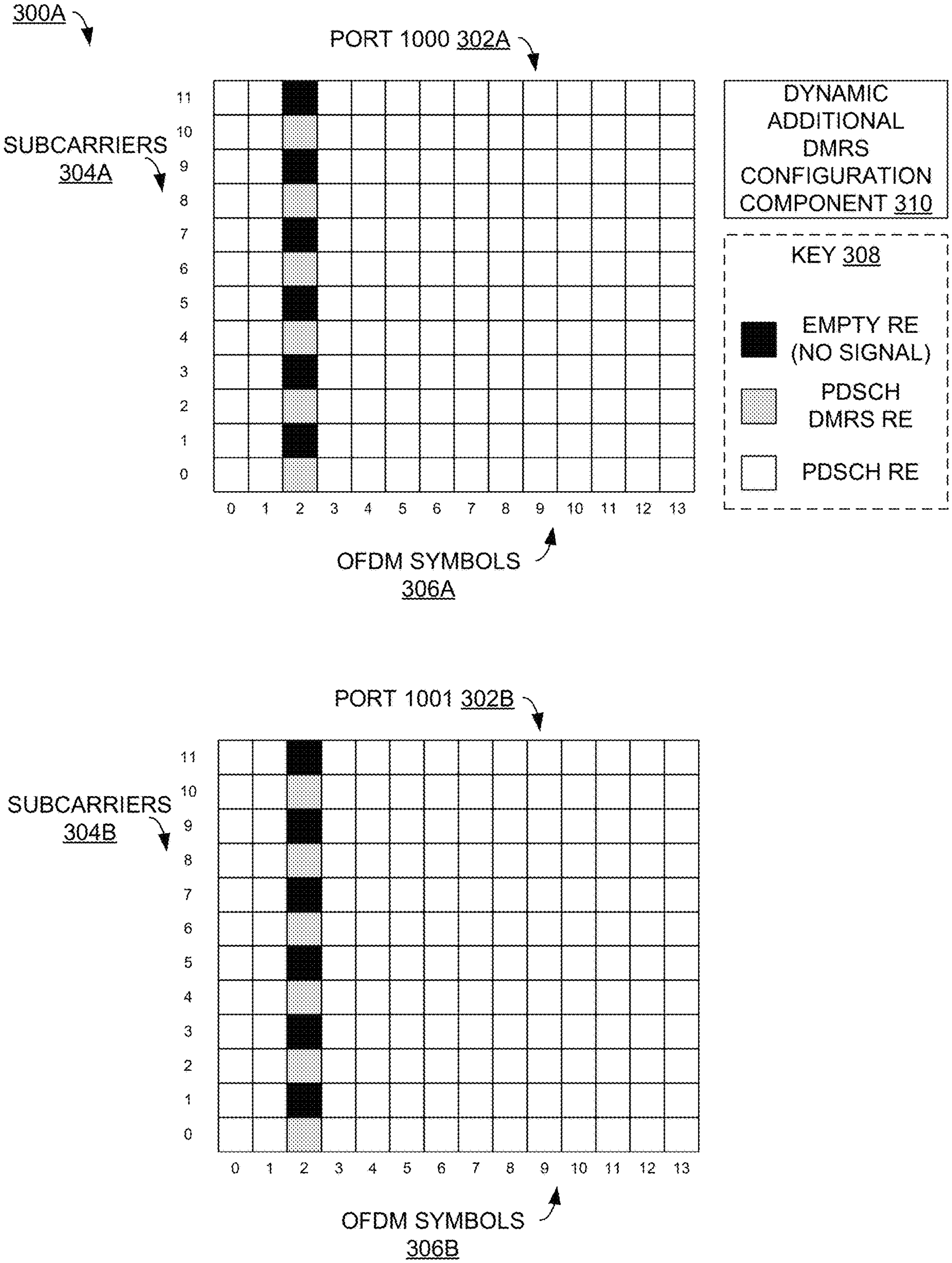
FIGS. 3A and 3B illustrate an example additional DMRS configuration that can facilitate dynamic additional DMRS configuration in accordance with an embodiment of this disclosure.

The examples described herein can generally relate to actions taken by user equipment in communicating with a base station to dynamically configure additional demodulation reference signals where carrier aggregation between a primary cell and secondary cell(s) is enabled. This dynamic configuration of additional demodulation reference signals can be established via a downlink control information (DCI) information element (IE).

In some examples of cellular communications, Radio Resource Control (RRC) and non-access stratum (NAS) layer messages can be used to exchange signaling between a base station and user equipment. These messages can include information elements that contain information about dynamically configuring additional demodulation reference signals.

It can be appreciated that corresponding actions can be taken by user equipment to also dynamically configure additional demodulation reference signals.

In cellular communications, there can be a master cell group (MCG) to which a user equipment (UE) initially registers. A cell that is used to initiate initial access can be referred to as a primary cell (Pcell). A Pcell can be combined with one or more secondary cells (Scells) under a MCG using carrier aggregation techniques, which can generally involve combining multiple carriers to increase bandwidth available to UEs.

The examples herein generally relate to 5G cellular communications networks, where Pcells and Scells are used. It can be appreciated that the present techniques can be applied to other types of cellular communications networks for dynamically configuring additional demodulation reference signals (DMRSes).

A DMRS can be utilized by a 5G new radio (NR) receiver to produce channel estimates for demodulation of an associated physical channel. A design and mapping of each DMRS can be specific to each 5G physical channel (e.g., physical broadcast channel (PBCH), physical downlink control channel (PDCCH), physical downlink shared channel (PDSCH), physical uplink control channel (PUSCH), and physical uplink shared channel (PUCCH)). DMRS can be user equipment (UE) specific, and be transmitted on demand. In some examples, a DMRS does not extend outside of a scheduled physical resource of a channel it supports. DMRS can support massive multi-user multiple-input and multiple-output (MIMO). DMRS can be beamformed and, in some examples, support up to 13 orthogonal layers. A DMRS sequence for a cyclic-prefix orthogonal frequency division multiplexing (CP-OFDM) version can be quadrature phase shift keying (QPSK) based on Gold Sequences.

With respect to PDSCH, DMRS can comprise front-loaded DMRS symbols (e.g., either 1 or 2) that are located as follows:

1. Slot based (DMRS mapping type-A): This can be a fixed orthogonal frequency division multiplexing (OFDM) symbol regardless of PDSCH assignment and that is configurable between lo={2,3}. Here, "Lo" means dmrs-typeA-position, which can be present at symbol2 or symbol3.
2. Non-slot based (DMRS mapping type-B): This can be a first OFDM symbol assigned for PDSCH—e.g., mini slots.

In some examples, additional DMRS symbols can be configured in scenarios such as high-speed mobility (e.g., handover); when downlink (DL)/uplink (UL) block error ratio (BLER) is high, and UE-reported channel condition is poor; and when a UE is located on a cell edge, and, because of that, the UE is not able to decode or send DL and UL packets.

With regard to PUSCH DMRS, in an uplink, it can be that two waveform types are supported (e.g., CP-OFDM, and discrete Fourier transform-spread orthogonal frequency division multiplexing (DFT-S-OFDM)). A gold sequence can be used in CP-OFDM, and a Zadoff-Chu sequence can be used in DFT-S-OFDM. Front loaded DMRS symbols (e.g., either 1 or 2) can be located at a first OFDM symbol that is assigned for PUSCH.

The present techniques can be implemented to solve the following problems.

One problem that can be solved by implementing the present techniques can be when a 5G base station (sometimes referred to as gNodeB or gNB; or more generally a base station) includes an dmrs-AdditionalPosition information element (IE) using DMRS-DownlinkConfig and DMRS-UplinkConfig for downlink and uplink, respectively, during UE attach or another UE-specific procedure, then that configuration can stay with the UE during the lifetime of the scenario unless it is modified by a radio resource control (RRC) modification procedure.

A dmrs-AdditionalPosition IE for DL and UL is indicated in FIGS. 1 and 2, respectively. That is, FIG. 1 illustrates an example DMRS downlink configuration information element 100 that can facilitate dynamic additional DMRS configuration in accordance with an embodiment of this disclosure. In example DMRS downlink configuration information element 100, there is dmrs-AdditionalPosition 102.

And FIG. 2 illustrates an example DMRS uplink configuration information element 200 that can facilitate dynamic additional DMRS configuration in accordance with an embodiment of this disclosure. In example DMRS uplink configuration information element 200, there is dmrs-AdditionalPosition 202.

Once this configuration is received by the UE, then the gNB and the UE can consider that configuration while determining a transport block (TB; which can generally determine data throughput of the UE). A TB can vary based on a number of additional DMRS positions that are configured.

Where a UE has one or more secondary cells that are activated, and the UE is configured with additional DMRS configuration for uplink and/or downlink, then this configuration can be applicable to all secondary cells where the UE is configured for Scells through RRC messaging.

Data throughput (TP) can be inversely proportional to a number of configured additional DMRS positions—that is, where more additional DMRS symbols are configured then there can be less data throughput.

Figure 3B:
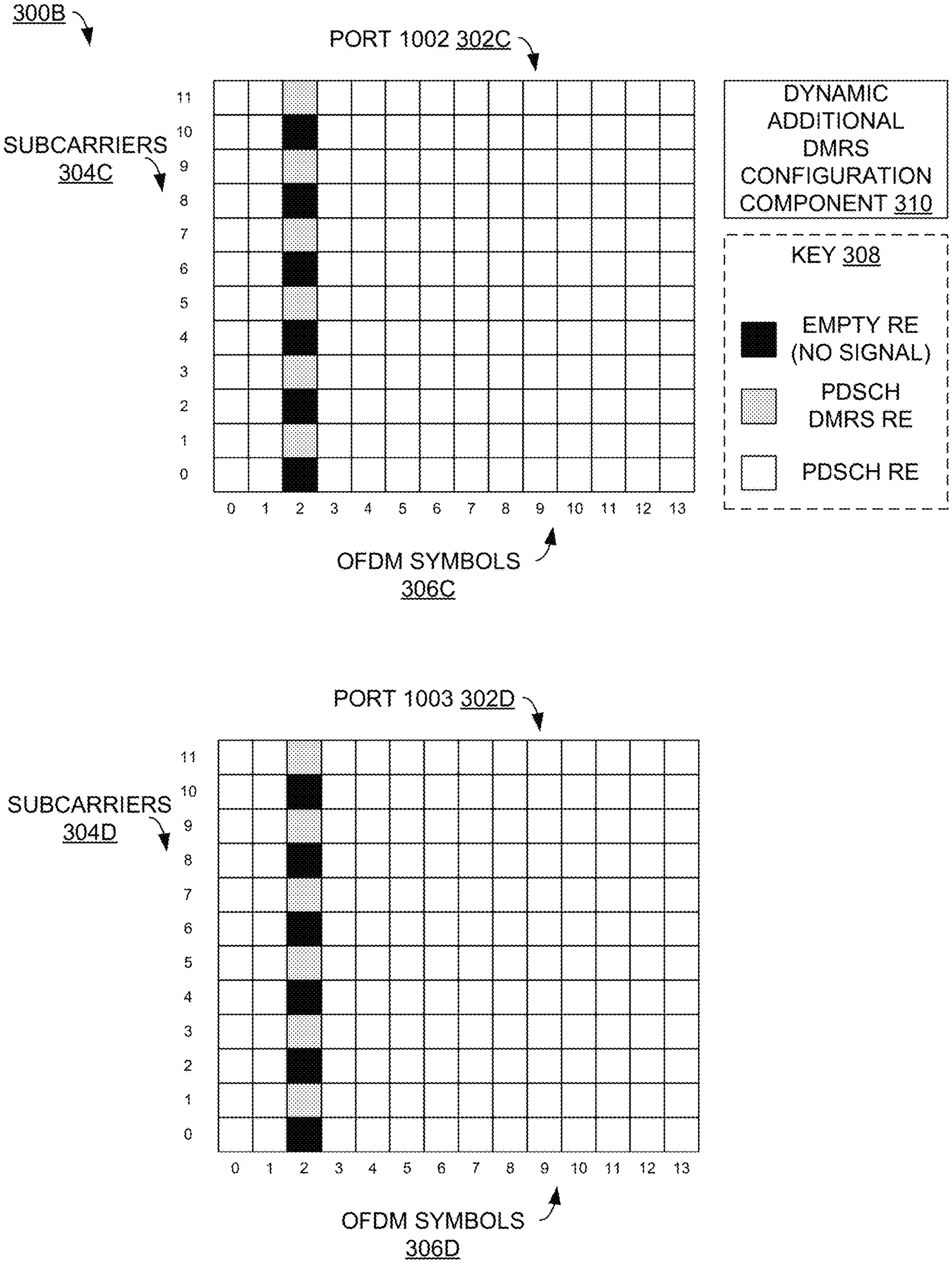

FIGS. 3A and 3B illustrate an example additional DMRS configuration 300A and 300B that can facilitate dynamic additional DMRS configuration in accordance with an embodiment of this disclosure. Example additional DMRS configuration 300A and 300B (as well as example additional DMRS configuration 400A and 400B of FIGS. 4A and 4B; example additional DMRS configuration 500A and 500B of FIGS. 5A and 5B; and example additional DMRS configuration 600A and 600B of FIGS. 6A and 6B) can have the following settings:

pdsch.NumLayers=4;
pdsch.MappingType='A';
pdsch.SymbolAllocation=[0 15]; % [startSymbol Length]
dmrs.DMRSconfigurationType=1;
dmrs.DMRSLength=1;
dmrs.DMRSTypeAPosition=2;
dmrs.NumCDMGroupsWithoutData=2;
dmrs.NIDNSCID=10;
dmrs.NSCID=0;

Additionally, example additional DMRS configuration 300A and 300B has "dmrs.DMRSAdditionalPosition=0;" which indicates that there are no additional DMRS positions configured. This configuration is illustrated in additional DMRS configuration 300A and 300B, which comprises port 1000 302A (with subcarriers 304A and OFDM symbols 306A); port 1001 302B (with subcarriers 304B and OFDM symbols 306B); port 1002 302C (with subcarriers 304C and OFDM symbols 306C); and port 1003 302D (with subcarriers 304D and OFDM symbols 306D).

Example additional DMRS configuration 300A and 300B also comprises dynamic additional DMRS configuration component 310 (which can comprise a computer component that implements the present techniques) and key 308. As depicted, FIGS. 3A and 3B relate to a 4-port antenna configuration, and dynamic additional DMRS configuration component 310 can comprise a 4-port dynamic additional DMRS configuration component.

Figure 4A:
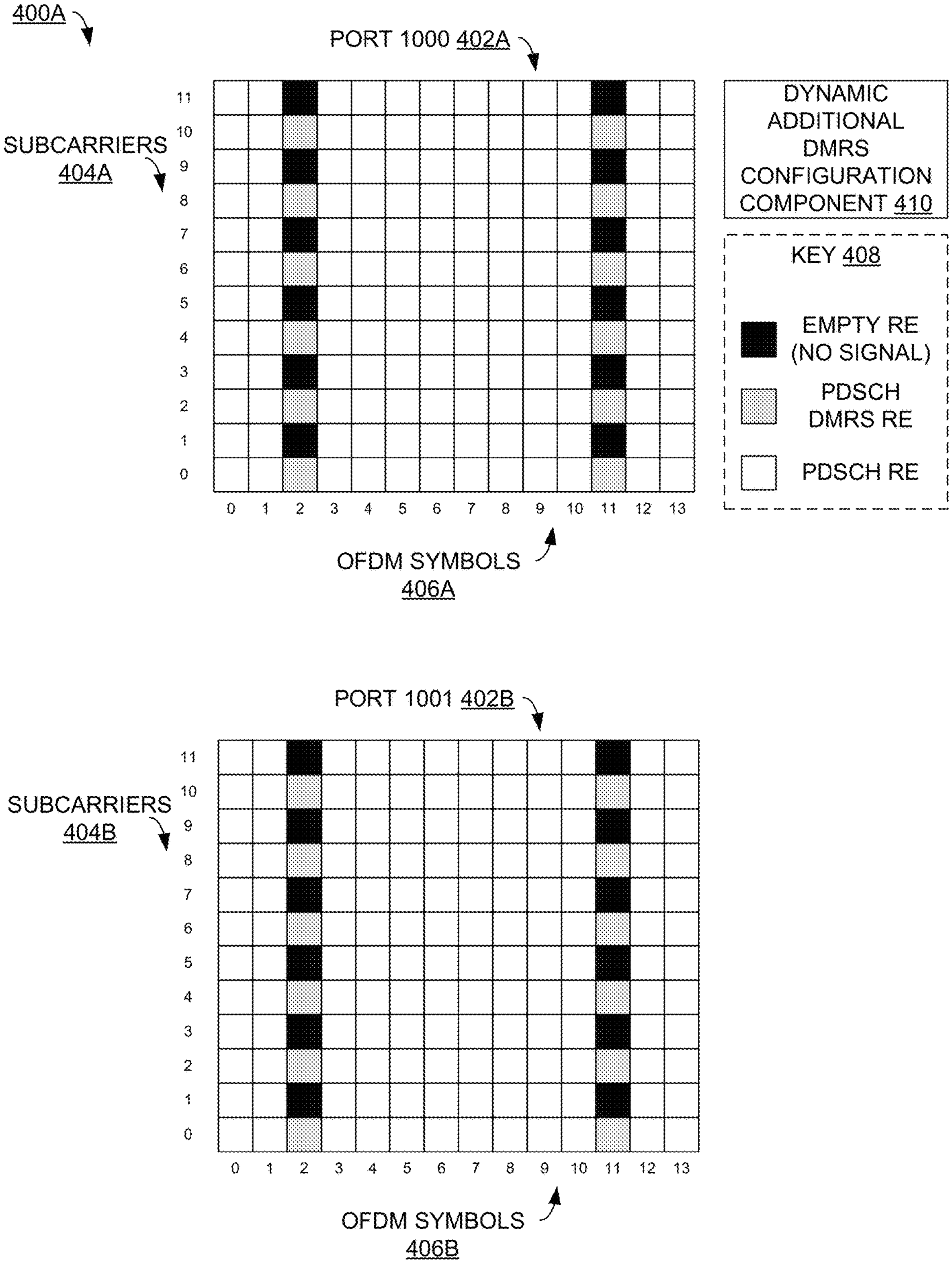
FIGS. 4A and 4B illustrate another example additional DMRS configuration that can facilitate dynamic additional DMRS configuration in accordance with an embodiment of this disclosure.
Figure 4B:
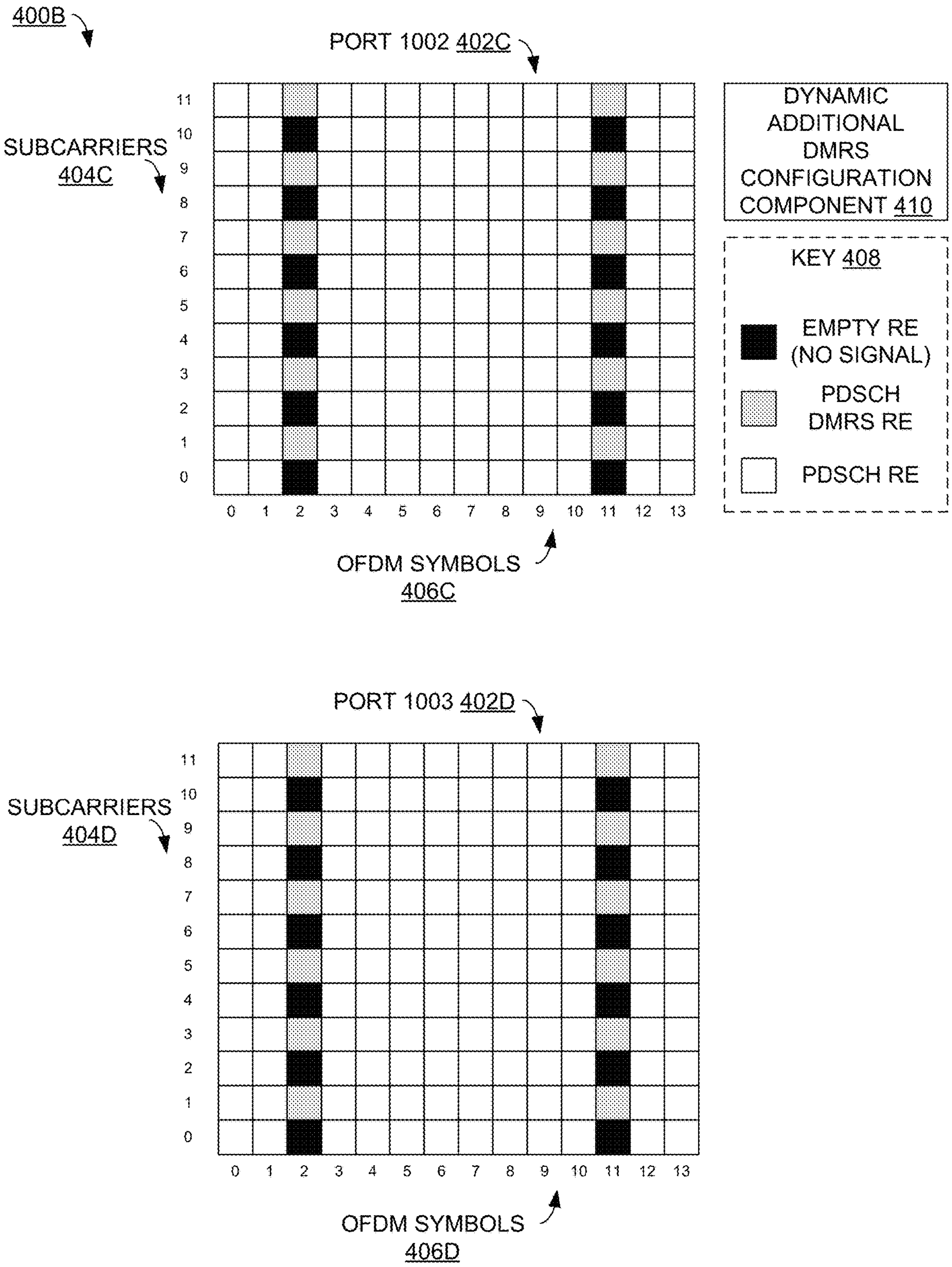

FIGS. 4A and 4B illustrate another example additional DMRS configuration 400A and 400B that can facilitate dynamic additional DMRS configuration in accordance with an embodiment of this disclosure.

Example additional DMRS configuration 400A and 400B has "dmrs.DMRSAdditionalPosition=1;" which indicates that there is one additional DMRS position configured. This configuration is illustrated in additional DMRS configuration 400A and 400B, which comprises port 1000 402A (with subcarriers 404A and OFDM symbols 406A); port 1001 402B (with subcarriers 404B and OFDM symbols 406B); port 1002 402C (with subcarriers 404C and OFDM symbols 406C); and port 1003 402D (with subcarriers 404D and OFDM symbols 406D).

Example additional DMRS configuration 400A and 400B also comprises dynamic additional DMRS configuration component 410 (which can comprise a computer component that implements the present techniques) and key 408.

Figure 5A:
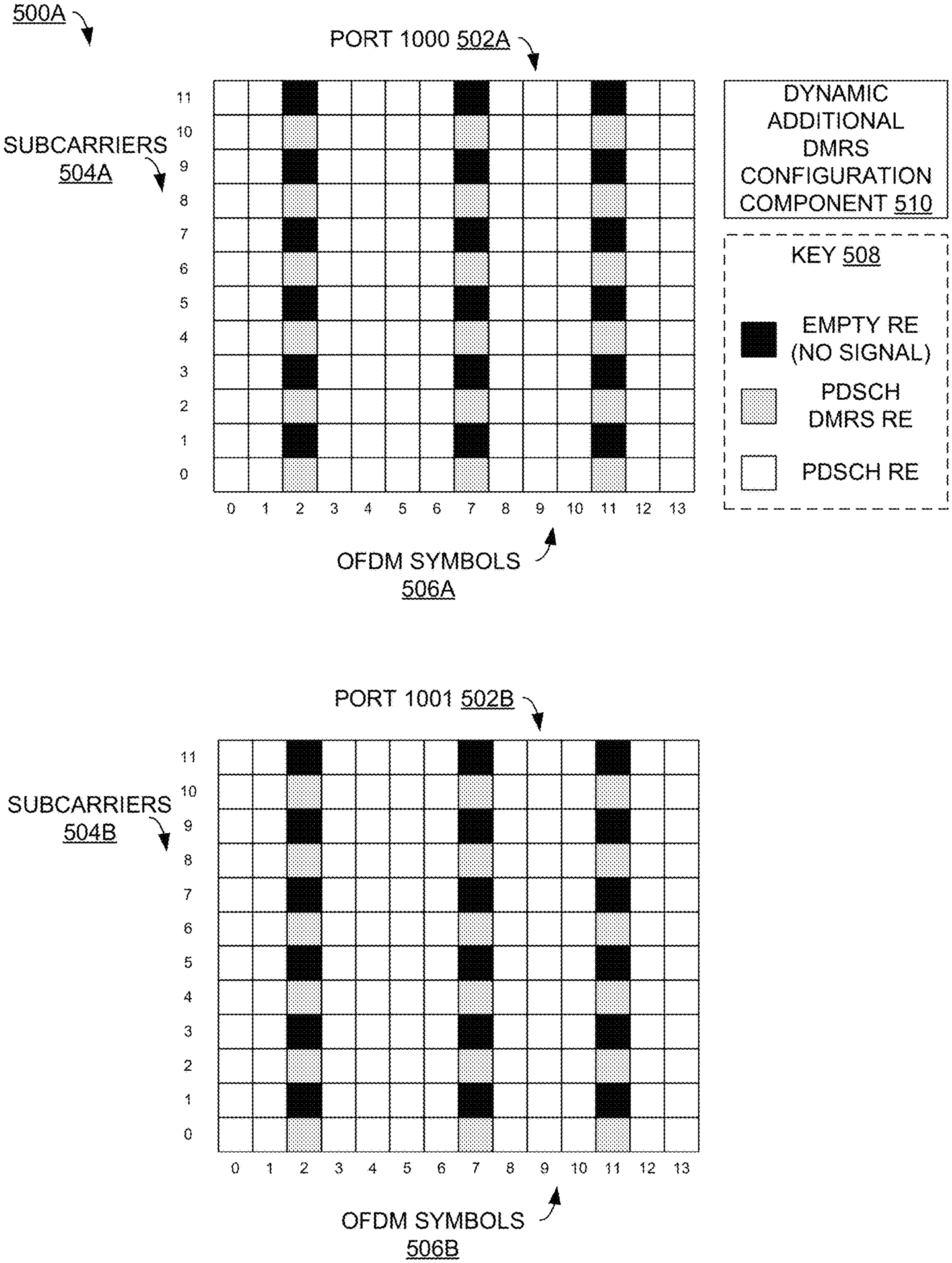
FIGS. 5A and 5B illustrate another example additional DMRS configuration that can facilitate dynamic additional DMRS configuration in accordance with an embodiment of this disclosure.
Figure 5B:
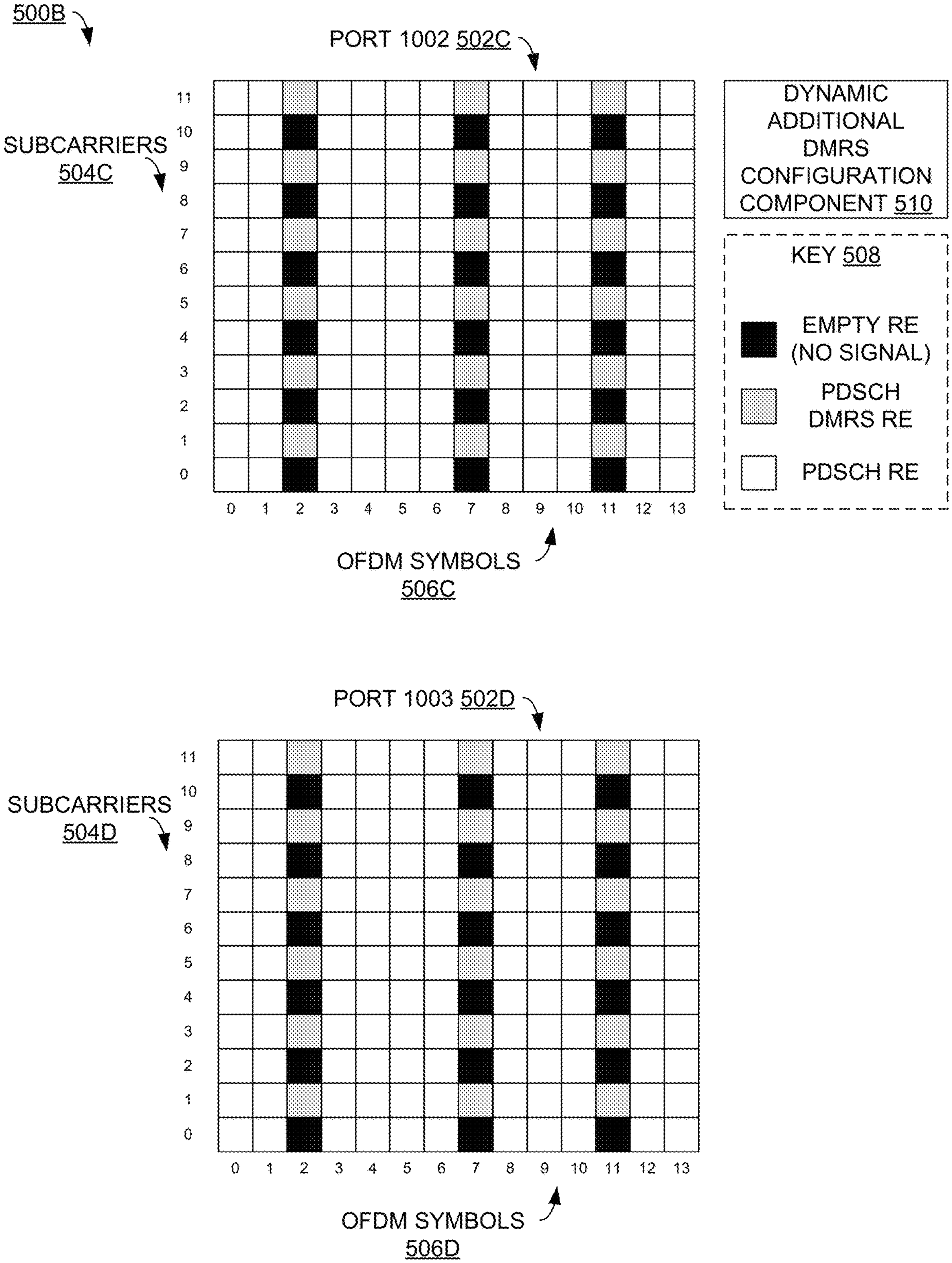

FIGS. 5A and 5B illustrate another example additional DMRS configuration 500A and 500B that can facilitate dynamic additional DMRS configuration in accordance with an embodiment of this disclosure.

Example additional DMRS configuration 500A and 500B has "dmrs.DMRSAdditionalPosition=2;" which indicates that there are two additional DMRS positions configured. This configuration is illustrated in additional DMRS configuration 500A and 500B, which comprises port 1000 502A (with subcarriers 504A and OFDM symbols 506A); port 1001 502B (with subcarriers 504B and OFDM symbols 506B); port 1002 502C (with subcarriers 504C and OFDM symbols 506C); and port 1003 502D (with subcarriers 504D and OFDM symbols 506D).

Example additional DMRS configuration 500A and 500B also comprises dynamic additional DMRS configuration component 510 (which can comprise a computer component that implements the present techniques) and key 508.

Figure 6A:
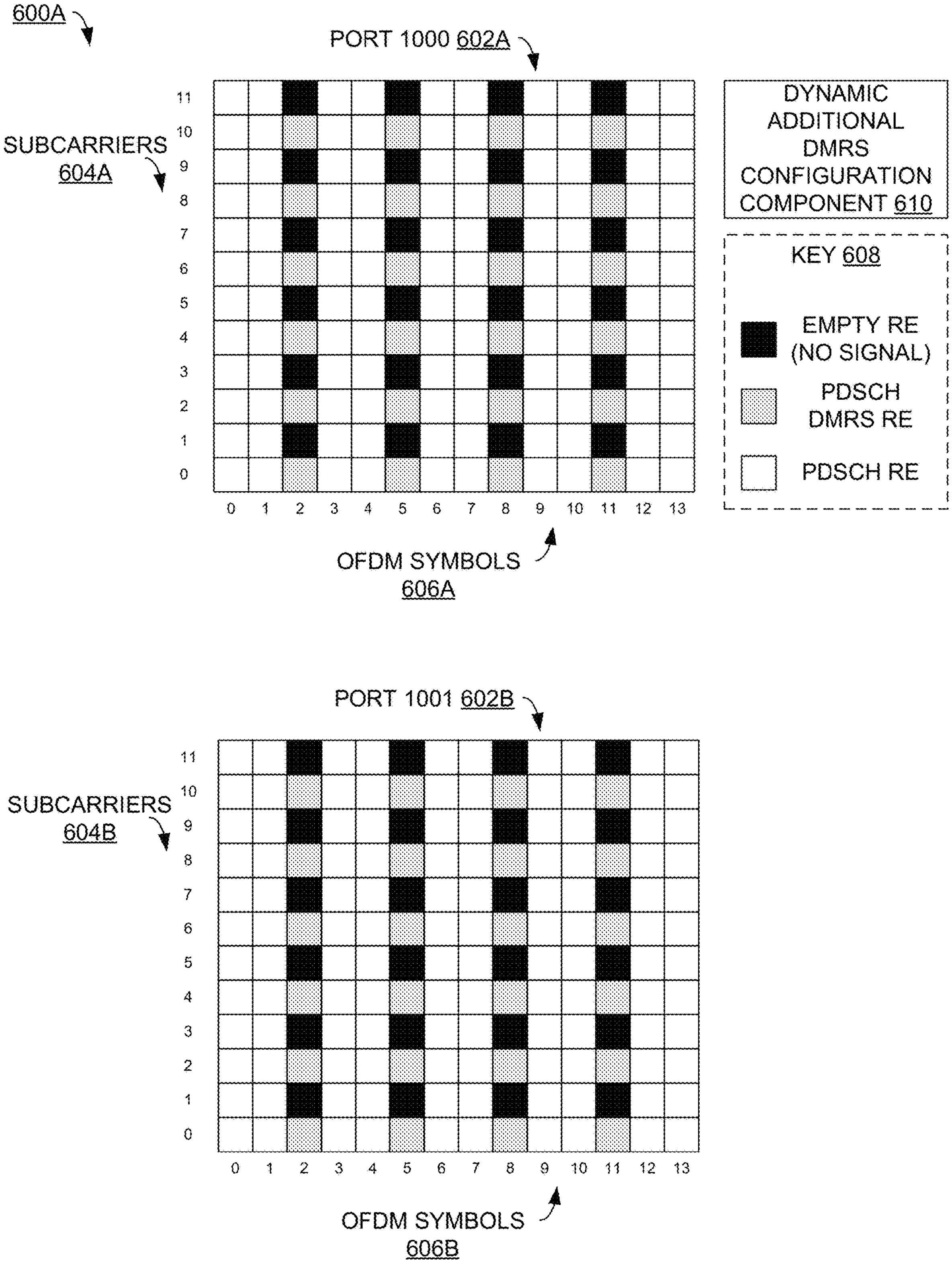
FIGS. 6A and 6B illustrate another example additional DMRS configuration that can facilitate dynamic additional DMRS configuration in accordance with an embodiment of this disclosure.
Figure 6B:
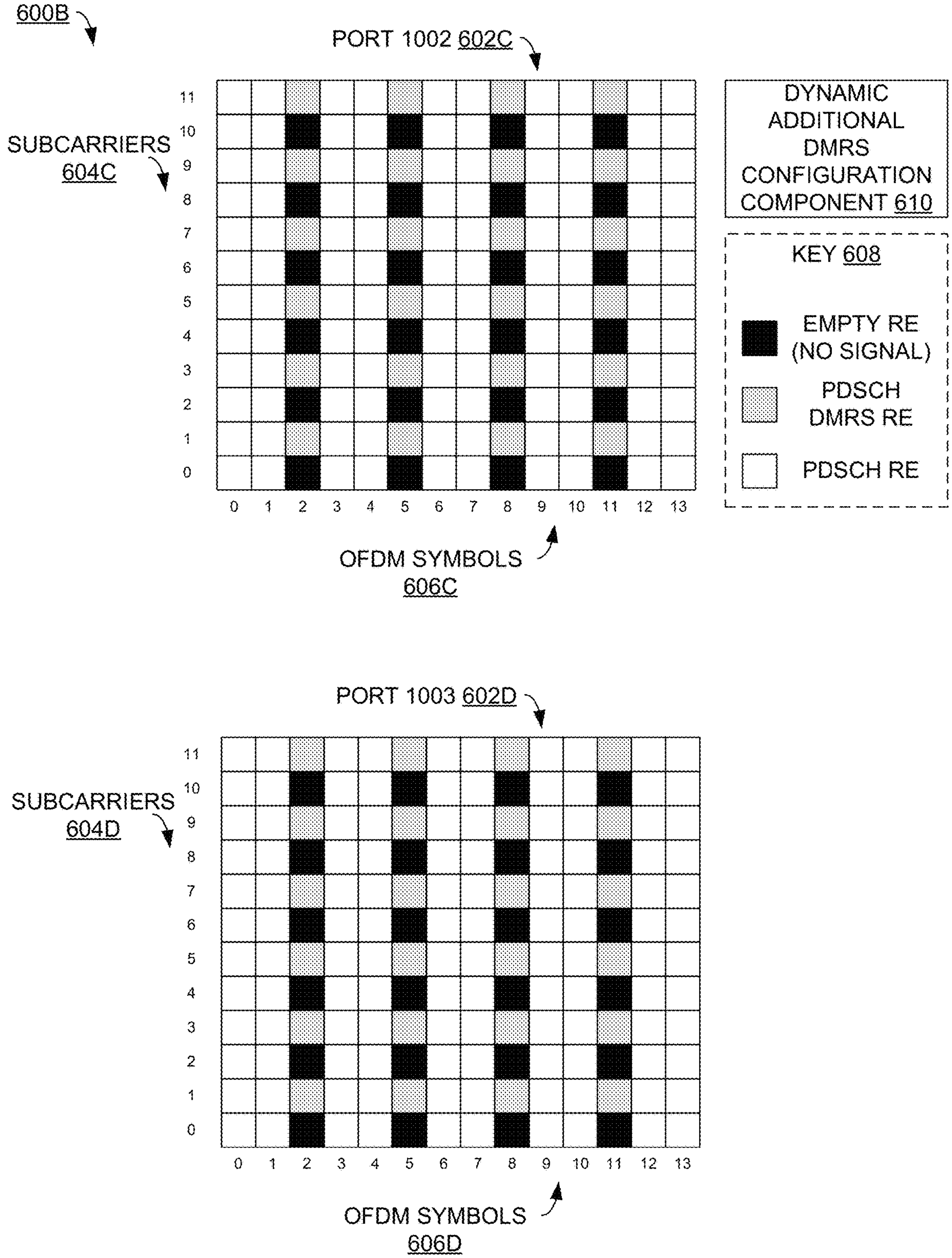

FIGS. 6A and 6B illustrate another example additional DMRS configuration 600A and 600B that can facilitate dynamic additional DMRS configuration in accordance with an embodiment of this disclosure.

Example additional DMRS configuration 600A and 600B has "dmrs.DMRSAdditionalPosition=3;" which indicates that there are three additional DMRS positions configured. This configuration is illustrated in additional DMRS configuration 600A and 600B, which comprises port 1000 602A (with subcarriers 604A and OFDM symbols 606A); port 1001 602B (with subcarriers 604B and OFDM symbols 606B); port 1002 602C (with subcarriers 604C and OFDM symbols 606C); and port 1003 602D (with subcarriers 604D and OFDM symbols 606D).

Example additional DMRS configuration 600A and 600B also comprises dynamic additional DMRS configuration component 610 (which can comprise a computer component that implements the present techniques) and key 608.

In the example of FIGS. 3A and 3B, there is no additional DMRS configured. In the example of FIGS. 4A and 4B, there is one additional DMRS symbol configured. In the example of FIGS. 5A and 5B, there are two additional DMRS symbols configured. In the example of FIGS. 6A and 6B, there are three additional DMRS symbols configured. So, in these examples, data throughput in FIGS. 3A and 3B can be greater than in FIGS. 4A and 4B, which can be greater than in FIGS. 5A and 5B, which can be greater than in FIGS. 6A and 6B.

As part of dynamically configuring additional DMRS positions, a component (e.g., dynamic additional DMRS configuration component 310 of FIGS. 3A and 3B) can dynamically switch between the configurations of FIGS. 3A and AB, 4A and 4B, 5A and 5B, and 6A and 6B One problem with additional DMRS configuration can be physical resource block (PRB) wastage because of an unnecessarily-configured higher additional DMRS position. Implementing the present techniques to dynamically change the additional DMRS position for each primary carrier component ($P_{cc}$) and secondary carrier component ($S_{cc}$) can be implemented to solve this problem.

Take an example where, during UE attach, a gNB configured an additional DMRS configuration in pos3 (indicating 3 additional DMRS symbols) for primary and secondary cells. Where radio/channel condition is good, where the UE is reporting a channel quality indicator (CQI), and UL and DL data BLER % are under 1% (indicating that a PDSCH and PUSCH packet decoding success rate is high), then having 3 symbols for additional DMRS can negatively impact data throughput.

Some prior approaches do not allow changing this configuration dynamically, and because of that, the gNB can be unnecessarily wasting a physical resource block.

Another problem with additional DMRS configuration can relate to frequent UE release, a UE performing a RRC reestablishment procedure, or a secondary cell failure procedure, because channel condition is poor. Implementing the present techniques to dynamically change the additional DMRS position can be implemented to solve this problem.

Take an example where, during UE attach, the gNB has not configured an additional DMRS configuration in DL and or UL. Where radio/channel condition is poor for the primary cell and/or secondary cell(s), where the UE is reporting CQI for primary and/or secondary cell(s) that is bad, and UL and DL BLER % is high for both cells (e.g., >20%, which can indicate that a success rate of decoding PDSCH packets is poor), it can be that the UE or gNB can perform a UE release, secondary cell failure procedure, and/or RRC reestablishment procedure. This procedure can take a long time to restore the connection. This problem can be avoided by dynamically configuring additional DMRS positions for primary and secondary cells based on channel quality to sustain the connection. In some prior approaches, this configuration cannot be dynamically altered.

Another problem with additional DMRS configuration can relate to a high-speed mobility (handover) scenario. In a high-speed handover scenario, channel/radio condition can be kept on frequently with respect to primary and/or secondary cells, to sustain and maintain good quality for a call. Additional DMRS symbols can be adapted dynamically based on reported CQI and BLER for all activated carriers, to achieve good throughput, while also not compromising by wasting physical resources.

Another problem with additional DMRS configuration can relate to a scenario where a UE is located at a cell edge. It can be that, when a UE is located at a cell edge, the UE's channel quality is subpar, and BLER % can be high for primary and/or secondary cells. To improve this condition, a gNB can quickly adapt an additional DMRS configuration. It can be that adapting a DMRS configuration based on link adaptation is not supported by prior approaches.

The present techniques for dynamic additional DMRS configuration can be implemented as follows.

In some examples, a new field (e.g., "additional DMRS indicator") can be implemented for downlink and uplink DL in downlink control information (DCI). A field for downlink can be added in DCI format 1_1. A field for uplink can be added in DCI format 0_1.

In some examples, an IE in UE capability for downlink and uplink can be implemented to support dynamic additional DMRS configuration. An IE ("dynamicAdditionalDMRSSupport") for downlink can be implemented in FeatureSetDownlink. Where a UE supports this IE, it can mean that the UE supports dynamic additional DMRS configuration change in the downlink direction.

An IE ("dynamicAdditionalDMRSSupport") for uplink can be implemented in FeatureSetUplink. Where a UE supports this IE, it can mean that the UE supports dynamic additional DMRS configuration change in the uplink direction.

In some examples, an IE ("dynamicAdditionalDmrsSupport") can be implemented in PDSCH-Config for downlink, and in PUSCH-Config for uplink.

Another approach can be to configure UE to be capable of handling a DCI for downlink and uplink with secondary cell activated.

Downlink secondary cells activation with downlink data flow with logic for triggering dynamic additional DMRS configuration using DCI for primary and/or secondary cells can be applied. Additionally, uplink secondary cells activation with uplink data flow with logic for triggering dynamic additional DMRS configuration using DCI can be applied.

Figure 7:
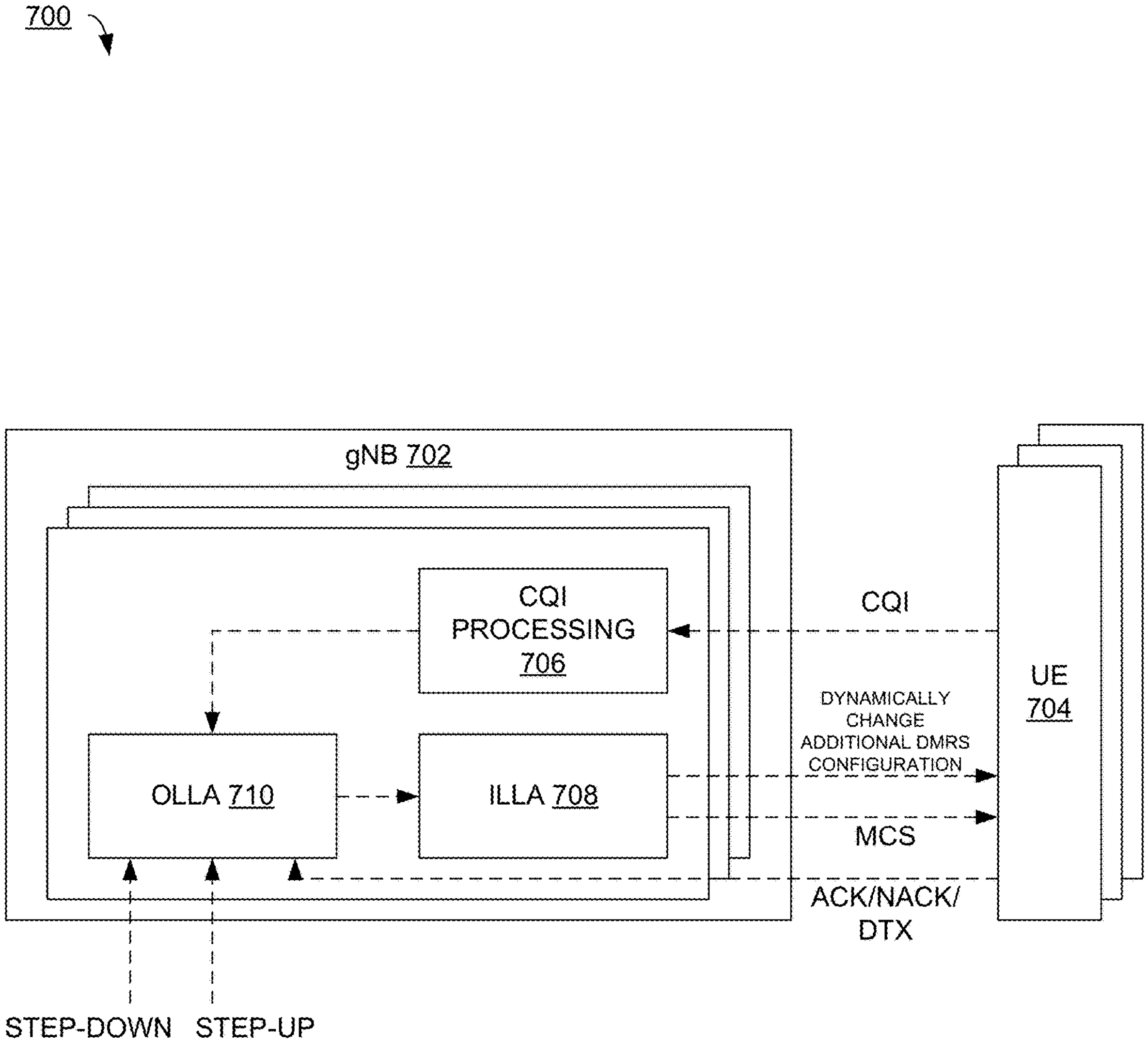
FIG. 7 illustrates an example system architecture that can facilitate dynamic additional DMRS configuration in accordance with an embodiment of this disclosure.

FIG. 7 illustrates an example system architecture 700 that can facilitate dynamic additional DMRS configuration in accordance with an embodiment of this disclosure. System architecture comprises gNB 702, UE 704, CQI processing 706, inner loop link adaptation (ILLA) 708, and gNB outer loop link adaptation (OLLA) 710 (which, in some examples, can more generally be a base station outer loop link adaptation).

In some examples, gNB 702 can determine additional DMRS information dynamically, as follows. As depicted in FIG. 7, where UE 704 is reporting channel quality using CQI, and hybrid automatic repeat request (HARQ) feedback (e.g., acknowledgment (ACK), negative acknowledgment (NACK), and discontinuous transmission (DTX)) for data transmission for primary and secondary cells, then, OLLA 710 can handle the HARQ feedback, and CQI processing 706 (for all activated cells) can handle CQI reported by UE 704.

Based on these two inputs, ILLA 708 can determine a modulation coding scheme (MCS) and additional DMRS position to be applied to UL and DL data transmission for primary and secondary cells where Scells are already activated.

ILLA 708 can determine the MCS by considering the CQI reported by UE 704, and HARQ feedback. In some examples, the higher the MCS, the better the channel/radio quality, meaning a smaller number of additional DMRS positions configured to UE 704 using the present techniques.

Where ILLA 708 determines to use a lower MCS, meaning the channel quality reported by UE 704 is not good and BLER is high, this can mean that ILLA 708 determines to increase the additional DMRS position in DL/UL DCI to decrease the BLER %.

The following can be communicated as part of conveying capability of a UE. A FeatureSetCombination information element can be as follows:

```
-- ASN1START
-- TAG-FEATURESETCOMBINATION-START
FeatureSetCombination ::=          SEQUENCE (SIZE
(1..maxSimultaneousBands)) OF FeatureSetsPerBand
FeatureSetsPerBand ::=             SEQUENCE (SIZE
(1..maxFeatureSetsPerBand)) OF FeatureSet
FeatureSet ::=                     CHOICE {
  eutra                              SEQUENCE {
    downlinkSetEUTRA                   FeatureSetEUTRA-
DownlinkId,
    uplinkSetEUTRA                     FeatureSetEUTRA-
UplinkId
  },
  nr                                 SEQUENCE {
    downlinkSetNR
FeatureSetDownlinkId,
    uplinkSetNR                        FeatureSetUplinkId
  }
}
-- TAG-FEATURESETCOMBINATION-STOP
-- ASN1STOP
```

An IE, FeatureSetDownlink, can indicate a set of features that a UE supports on carriers corresponding to one band entry in a band combination. A FeatureSetDownlink IE can be as follows:

```
-- ASN1START
-- TAG-FEATURESETDOWNLINK-START
FeatureSetDownlink ::=                 SEQUENCE {
  featureSetListPerDownlinkCC            SEQUENCE (SIZE
(1..maxNrofServingCells)) OF FeatureSetDownlinkPerCC-Id,
  intraBandFreqSeparationDL
FreqSeparationClass
OPTIONAL,
  scalingFactor                          ENUMERATED
{f0p4, f0p75, f0p8}
OPTIONAL,
  crossCarrierScheduling-OtherSCS        ENUMERATED
{supported}
OPTIONAL,
  scellWithoutSSB                        ENUMERATED
{supported}
OPTIONAL,
  csi-RS-MeasSCellWithoutSSB             ENUMERATED
{supported}
```

-continued

```
OPTIONAL,
.....................
      -- An IE to indicate UE capability to support downlink
dynamic additional DMRS feature.
   dynamicAdditionalDMRSSupport          ENUMERATED
{supported}
OPTIONAL,
.....................
   dummy1                                ENUMERATED
{supported}
OPTIONAL,
   dummy6                                SEQUENCE (SIZE
(1.. maxNrofCodebooks)) OF DummyD
OPTIONAL,
   dummy7                                SEQUENCE (SIZE
(1.. maxNrofCodebooks)) OF DummyE
OPTIONAL
}
-- TAG-FEATURESETDOWNLINK-STOP
-- ASN1STOP
```

In a FeatureSetDownlink IE, a UE can set a dynamicAdditionalDMRSSupport field to support where the UE is capable of supporting downlink additional DMRS features.

An IE, FeatureSetUplink, can indicate a set of features that a UE supports on carriers corresponding to one band entry in a band combination. A FeatureSetUplink IE can be as follows:

```
-- ASN1START
-- TAG-FEATURESETUPLINK-START
FeatureSetUplink ::=                     SEQUENCE {
   featureSetListPerUplinkCC             SEQUENCE (SIZE (1..
maxNrofServingCells)) OF FeatureSetUplinkPerCC-Id,
   scalingFactor                         ENUMERATED {f0p4,
f0p75, f0p8}
OPTIONAL,
   crossCarrierScheduling-OtherSCS       ENUMERATED
{supported}
OPTIONAL,
   intraBandFreqSeparationUL             FreqSeparationClass
OPTIONAL,
   searchSpaceSharingCA-UL               ENUMERATED
{supported}
OPTIONAL,
...............
      -- An IE to indicate UE capability to support Uplink
dynamic additional DMRS feature.
   dynamicAdditionalDMRSSupport            ENUMERATED
{supported}
OPTIONAL,
...............
   dummy1                                DummyI
OPTIONAL,
   supportedSRS-Resources                SRS-Resources
OPTIONAL,
   twoPUCCH-Group                        ENUMERATED
{supported}
OPTIONAL,
   dynamicSwitchSUL                      ENUMERATED
{supported}
OPTIONAL,
   simultaneousTxSUL-NonSUL              ENUMERATED
{supported}
OPTIONAL,
   pusch-ProcessingType1-DifferentTB-PerSlot SEQUENCE {
      scs-15kHz                             ENUMERATED
{upto2, upto4, upto7}
OPTIONAL,
      scs-30kHz                             ENUMERATED
{upto2, upto4, upto7}
OPTIONAL,
      scs-60kHz                             ENUMERATED
{upto2, upto4, upto7}
```

-continued

```
OPTIONAL,
      scs-120kHz                            ENUMERATED
{upto2, upto4, upto7}
OPTIONAL
   }
OPTIONAL,
   dummy2                                DummyF
OPTIONAL
}
-- TAG-FEATURESETUPLINK-STOP
-- ASN1STOP
```

In a FeatureSetUplink IE, a UE can set a dynamicAdditionalDMRSSupport field to support where the UE is capable of supporting uplink additional DMRS features.

A PDSCH-Config IE that is used to configure a UE's specific PDSCH parameters can be as follows:

```
-- ASN1START
-- TAG-PDSCH-CONFIG-START
PDSCH-Config ::=                             SEQUENCE {
   dataScramblingIdentityPDSCH                INTEGER
(0..1023)
OPTIONAL,   -- Need S
   dmrs-DownlinkForPDSCH-MappingTypeA        SetupRelease {
DMRS-DownlinkConfig }
OPTIONAL,   -- Need M
   dmrs-DownlinkForPDSCH-MappingTypeB        SetupRelease {
DMRS-DownlinkConfig }
OPTIONAL,   -- Need M
   ...............
   ...............
      -- An IE to support dynamic additional DMRS position
change.
   dynamicAdditionalDmrsSupport              ENUMERATED
{enabled}          OPTIONAL,   -- Need S
   ...............
   ...............
   tci-StatesToAddModList                    SEQUENCE
(SIZE(1..maxNrofTCI-States)) OF TCI-State
OPTIONAL,   -- Need N
   pdsch-TimeDomainAllocationList-r16          SetupRelease {
PDSCH-TimeDomainResourceAllocationList-r16 }
OPTIONAL,   -- Need M
   repetitionSchemeConfig-r16                  SetupRelease {
RepetitionSchemeConfig-r16}                      OPTIONAL
-- Need M
   ]]
}
-- TAG-PDSCH-CONFIG-STOP
-- ASN1STOP
```

In a PDSCH-Config, where a dynamicAdditionalDmrsSupport IE is configured to indicate that an additional DMRS feature is enabled, then a gNB can include "additional DMRS indicator" in downlink DCI format 1_1. In some examples, it can be that, otherwise, this feature is not supported if this field is absent.

An IE, PUSCH-Config, that can be used to configure UE specific PUSCH parameters applicable to a particular band width part (BWP) can be as follows:

```
-- ASN1START
-- TAG-PUSCH-CONFIG-START
PUSCH-Config ::=                             SEQUENCE {
   dataScramblingIdentityPUSCH                INTEGER
(0..1023)
OPTIONAL,   -- Need S
   txConfig                                   ENUMERATED
{codebook, nonCodebook}
```

-continued

```
OPTIONAL,    -- Need S
      dmrs-UplinkForPUSCH-MappingTypeA          SetupRelease {
DMRS-UplinkConfig }
OPTIONAL,    -- Need M
      dmrs-UplinkForPUSCH-MappingTypeB          SetupRelease {
DMRS-UplinkConfig }
OPTIONAL,    -- Need M
   ...............
   ...............
         -- Newly proposed IE to support dynamic additional
DMRS position change.
      dynamicAdditionalDmrsSupport              ENUMERATED
{enabled}               OPTIONAL,    -- Need S
   ...............
   ...............
}
-- TAG-PUSCH-CONFIG-STOP
 -- ASN1STOP
```

In a PUSCH-Config, where a dynamicAdditionalDmrs-Support IE is configured to indicate that an additional DMRS feature is enabled, then a gNB can include "additional DMRS indicator" in uplink DCI format 0_1. In some examples, it can be that, otherwise, this feature is not supported if this field is absent.

In some examples, DL DCI format 1_1 can include the following field relating to additional DMRS symbol configuration::

| Field (Item) | Bits | Description |
|---|---|---|
| Additional DMRS Indicator | 2 | Additional DMRS Symbol configuration<br>0 - If no Additional DMRS symbol configured.<br>1 - One additional DMRS symbol configured.<br>2 - two additional DMRS symbols configured.<br>3 - Three additional DMRS symbols configured. |

In some examples, UL DCI format 0_1 can include the following field relating to additional DMRS symbol configuration:

| Field (Item) | Bits | Description |
|---|---|---|
| Additional DMRS Indicator | 2 | Additional DMRS Symbol configuration<br>0 - If no Additional DMRS symbol configured.<br>1 - One additional DMRS symbol configured.<br>2 - two additional DMRS symbols configured.<br>3 - Three additional DMRS symbols configured. |

Figure 8A:
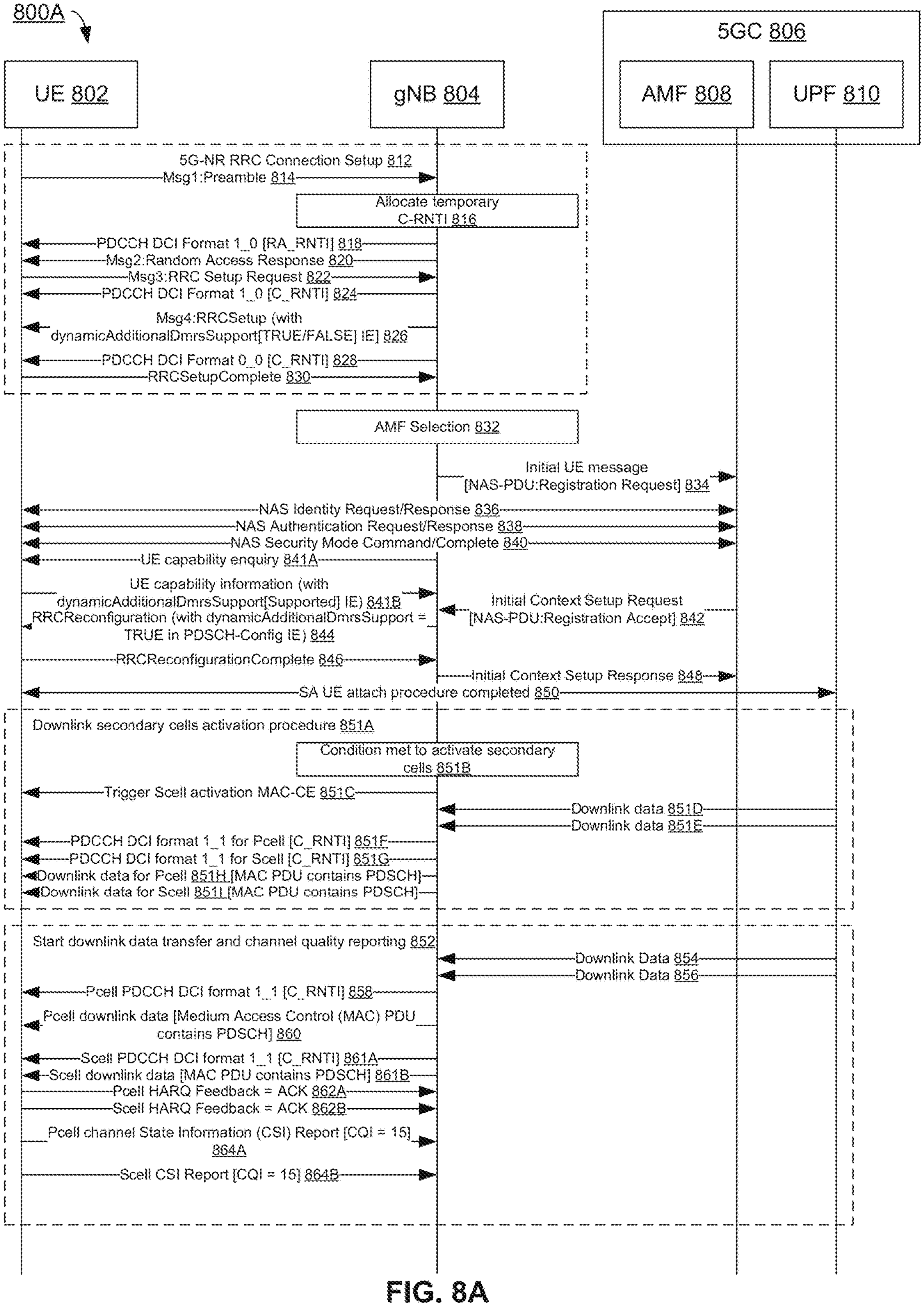
FIGS. 8A and 8B illustrate an example signal flow for dynamic additional DMRS configuration for a downlink, and that can facilitate dynamic additional DMRS configuration in accordance with an embodiment of this disclosure.
Figure 8B:
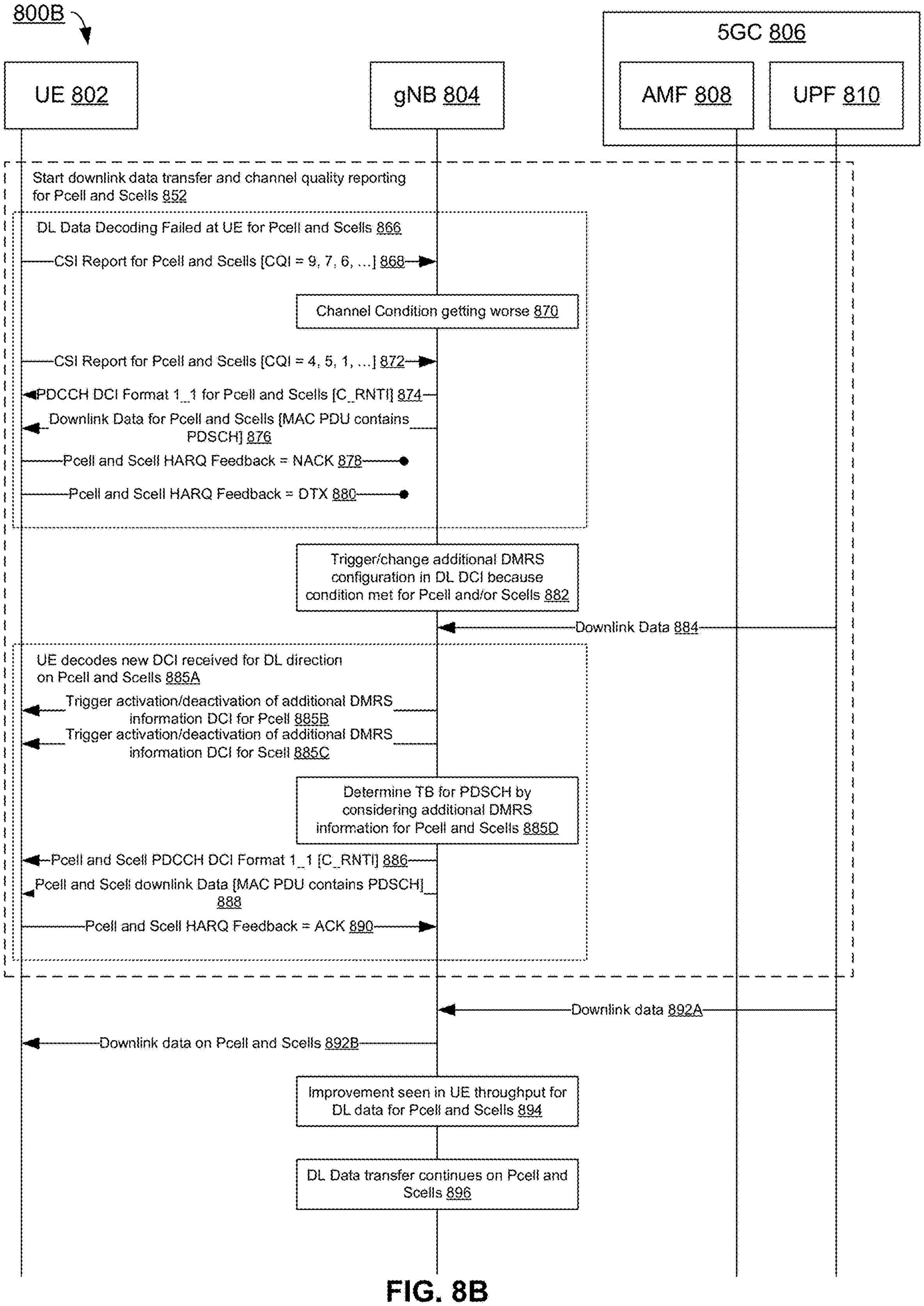

FIGS. 8A and 8B illustrate an example signal flow 800 for dynamic additional DMRS configuration for a downlink, and that can facilitate dynamic additional DMRS configuration in accordance with an embodiment of this disclosure. As depicted, in signal flow 800, communications are sent between user equipment 802, gNB 804, and 5G core (5GC) 806 (which comprises access and mobility management function (AMF) 808 and user plane function (UPF) 810).

The signal flow of signal flow 800 is an example signal flow, and there can be signal flows that implement different signals, or the signals of signal flow 800 in a different order, as part of facilitating dynamic additional DMRS configuration.

As depicted in signal flow 800, the following occurs:

5G-NR RRC connection setup 812

Msg1:Preamble 814

Allocate temporary Cell Radio Network Temporary Identifier (C-RNTI) 816

PDCCH DCI Format 1_0 [Random Access RNTI (RA_RNTI)] 818

Msg2:Random Access Response 820

Msg3:RRCSetupRequest 822

PDCCH DCI Format 1_0 [C_RNTI] 824

Msg4:RRCSetup 826, where a dynamicAdditionalDmrs-Support[TRUE/FALSE] IE is contained in this message, and can be added as part of the present techniques PDCCH DCI Format 0_0 [C_RNTI] 828

RRCSetupComplete 830

AMF Selection 832

Initial UE message [Non-Access-Stratum-Protocol Data Unit (NAS-PDU):Registration Request] 834

NAS Identity Request/Response 836

NAS Authentication Request/Response 838

NAS Security Mode Command/Complete 840

UE capability enquiry 841A

UE capability information, with dynamicAdditionalDmrsSupport[Supported] IE in FeatureSetDownlink 841B Initial Context Setup Request [NAS-PDU:Registration Accept] 842

RRCReconfiguration with dynamicAdditionalDmrsSupport=TRUE in PDSCH-Config IE where UE supports this feature in downlink 844 (which can indicate that the UE already supports a dynamic additional DMRS feature that is communicated by the UE in 841B as part of UE capability information; here, a gNB can add this IE in a RRCE Reconfiguration message)

RRCReconfigurationComplete 846

Initial Context Setup Response 848

Standalone (SA) UE attach procedure completed 850

Downlink secondary cells activation procedure 851A

Condition met to activate secondary cells 851B

Trigger Scell activation Medium Access Control Control Element (MAC-CE) 851C—In some examples, a MAC-CE message is sent at a MAC layer of cellular communications. Communications conducted at a MAC layer can be faster as compared to, for example, RRC layer communicationsDownlink data 851D Downlink data 851E PDCCH DCI format 1_1 for Pcell [C_RNTI] 851F PDCCH DCI format 1_1 for Scell [C_RNTI] 851G Downlink data for Pcell 851H [MAC PDU contains PDSCH]

Downlink data for Scell 851I [MAC PDU contains PDSCH]

Start downlink data transfer and channel quality reporting 852

Downlink data 854

Downlink data 856

Pcell PDCCH DCI format 1_1 [C_RNTI] 858

Pcell downlink data [Medium Access Control (MAC) PDU contains PDSCH] 860

Scell PDCCH DCI format 1_1 [C_RNTI] 861A

Scell downlink data [MAC PDU contains PDSCH] 861B

Pcell HARQ Feedback=ACK 862A

Scell HARQ Feedback=ACK 862B

Pcell channel State Information (CSI) Report [CQI=15] 864A

Scell CSI Report [CQI=15] 864B

DL data decoding failed at UE for Pcell and/or Scells 866
CSI Report for Pcell and Scells [CQI=9, 7, 6, . . . ] 868
Channel condition gets worse 870
CSI Report for Pcell and Scells [CQI=4, 5, 1, . . . ] 572
PDCCH DCI Format 1_1 for Pcell and Scells [C_RNTI] 874
Downlink Data on Pcell and Scells [MAC PDU contains PDSCH] 876
Pcell and Scell HARQ Feedback=NACK 878
Pcell and Scell HARQ Feedback=DTX 880
Trigger/change additional DMRS configuration in DL DCI because condition met for Pcell and/or Scells 882, where, in some examples, a condition can be CQI reporting is bad for a certain threshold and period; HARQ feedback is reported as NACK (e.g., BLER is high for a certain threshold and period); UE is on a cell edge; and/or UE is on high mobility
Downlink Data 884
UE decodes new DCI received for DL direction on Pcell and Scells 885A
Trigger activation/deactivation of additional DMRS information DCI for Pcell 885B
Trigger activation/deactivation of additional DMRS information DCI for Scell 885C
Determine transport block (TB) for PDSCH by considering additional DMRS information for Pcell and Scells 885D
Pcell and Scell PDCCH DCI Format 1_1 [C_RNTI] 886
Pcell and Scell downlink Data [MAC PDU contains PDSCH] 888
Pcell and Scell HARQ Feedback=ACK 890
Downlink data 892A
Downlink data on Pcell and Scells 892B
Improvement seen in UE throughput for DL data for Pcell and Scells 894
DL Data transfer continues on Pcell and Scells 896

Figure 9A:
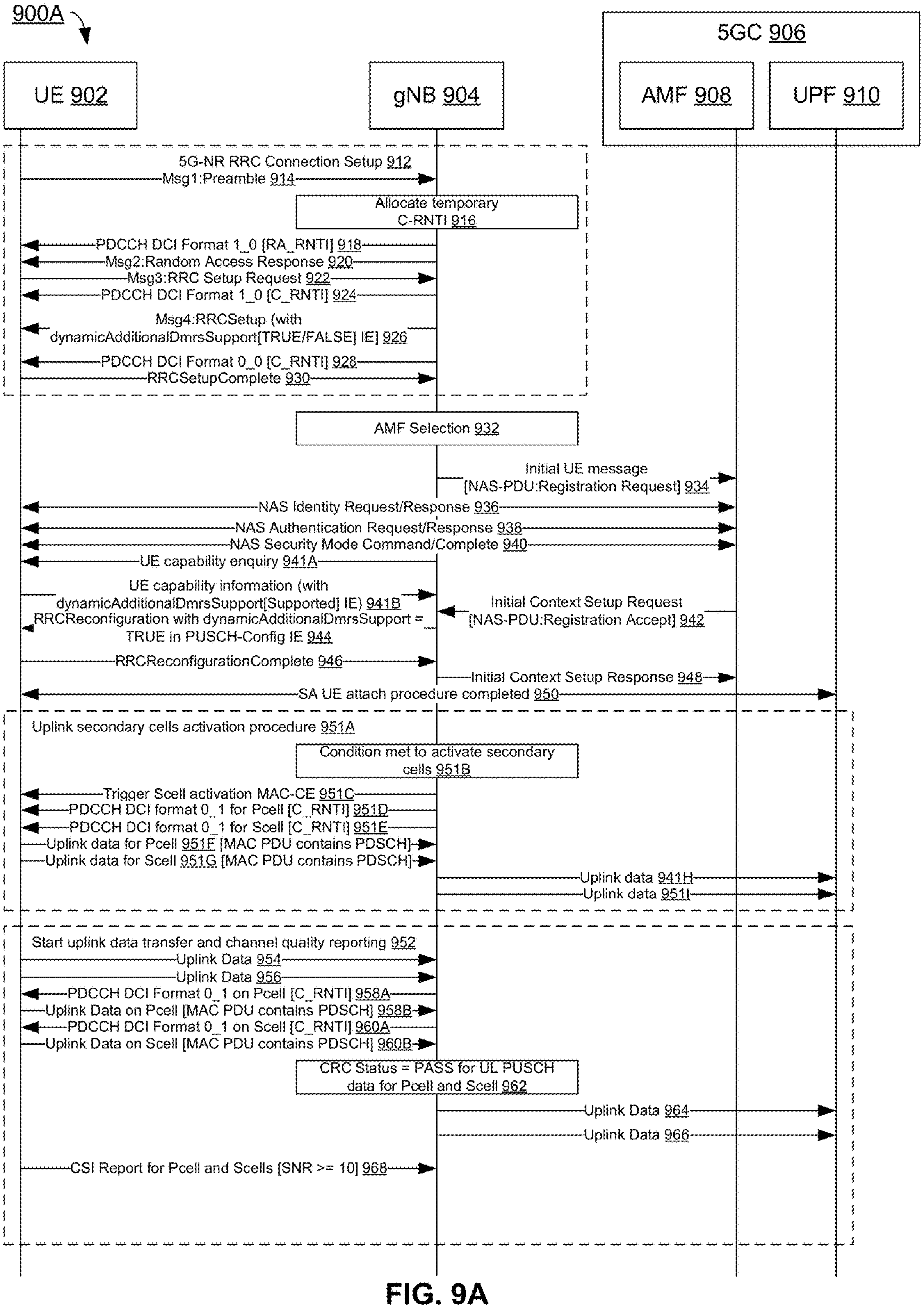
FIGS. 9A and 9B illustrates an example signal flow for dynamic additional DMRS configuration for a uplink, and that can facilitate dynamic additional DMRS configuration in accordance with an embodiment of this disclosure.
Figure 9B:
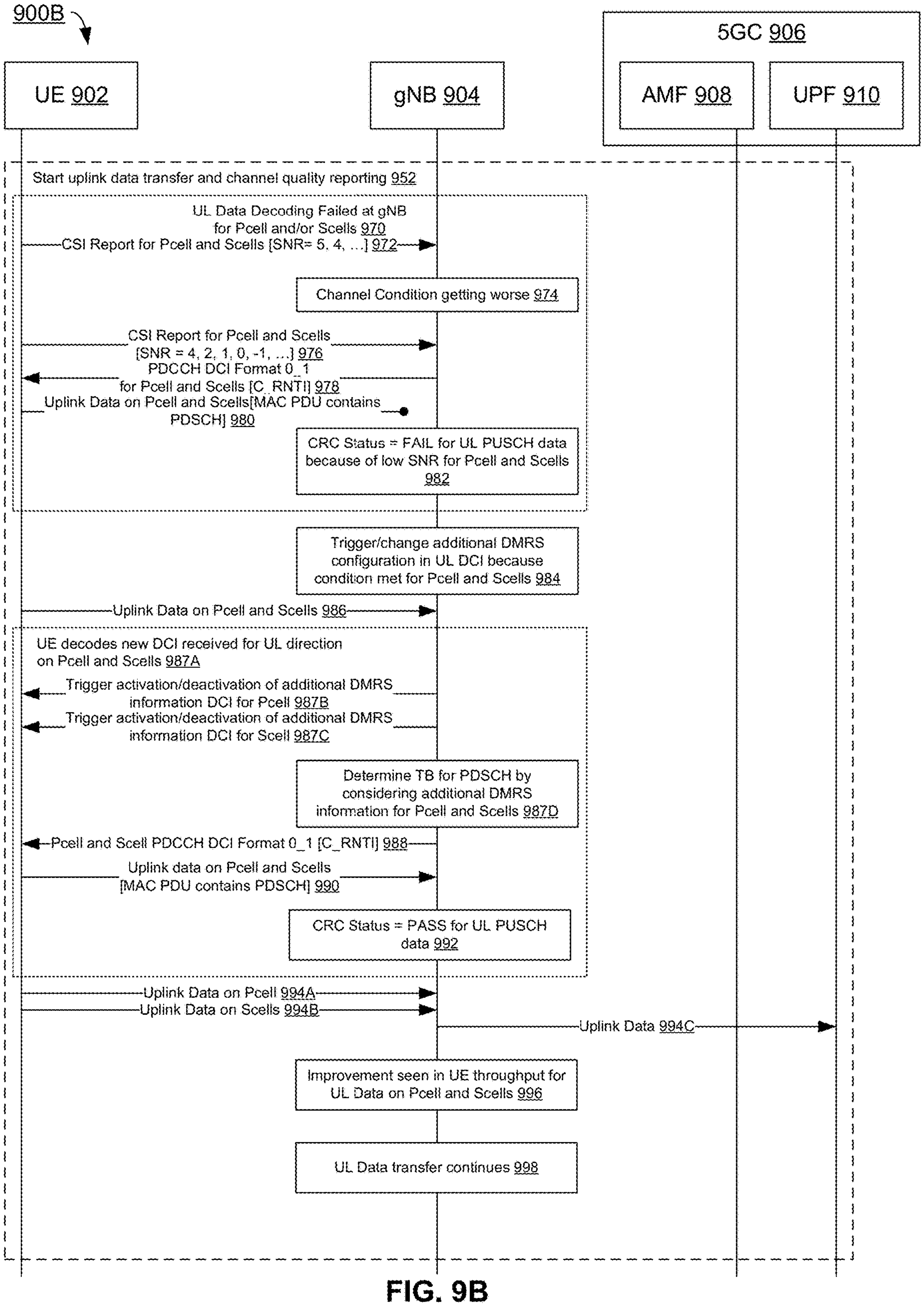

FIGS. 9A and 9B illustrate an example signal flow for dynamic additional DMRS configuration for a uplink, and that can facilitate dynamic additional DMRS configuration in accordance with an embodiment of this disclosure.

As depicted, in signal flow 900, communications are sent between user equipment 902, gNB 904, and 5GC 906 (which comprises AMF 908 and UPF 910).

The signal flow of signal flow 900 is an example signal flow, and there can be signal flows that implement different signals, or the signals of signal flow 900 in a different order, as part of facilitating dynamic additional DMRS configuration.

As depicted in signal flow 900, the following occurs:

5G-NR RRC connection setup 912
Msg1:Preamble 914
Allocate temporary C-RNTI 916
PDCCH DCI Format 1_0 [RA_RNTI] 918
Msg2:Random Access Response 920
Msg3:RRCSetupRequest 922
PDCCH DCI Format 1_0 [C_RNTI] 924
Msg4:RRCSetup 926, where a dynamicAdditionalDmrsSupport[TRUE/FALSE] IE is contained in this message, and can be added as part of the present techniques
PDCCH DCI Format 0_0 [C_RNTI] 928
RRCSetupComplete 930
AMF Selection 932
Initial UE message [NAS-PDU:Registration Request] 934
NAS Identity Request/Response 936
NAS Authentication Request/Response 938
NAS Security Mode Command/Complete 940
UE capability enquiry 941A
UE capability information, with dynamicAdditionalDmrsSupport[Supported] IE in FeatureSetUplink 941B
Initial Context Setup Request [NAS-PDU:Registration Accept] 942
RRCReconfiguration with dynamicAdditionalDmrsSupport=TRUE in PUSCH-Config IE where UE supports this feature in uplink 944
RRCReconfigurationComplete 946
Initial Context Setup Response 948
SA UE attach procedure completed 950
Uplink secondary cells activation procedure 951A
Condition met to activate secondary cells 951B
Trigger Scell activation MAC-CE 951C
PDCCH DCI format 1_1 for Pcell [C_RNTI] 9851D
PDCCH DCI format 1_1 for Scell [C_RNTI] 951E
Uplink data for Pcell 951F [MAC PDU contains PDSCH]
Uplink data for Scell 951G [MAC PDU contains PDSCH]
Uplink data 951H
Uplink data 951I
Start uplink data transfer and channel quality reporting 952
Uplink data 954
Uplink data 956
PDCCH DCI Format 0_1 on Pcell [C_RNTI] 958A
Uplink Data on Pcell [MAC PDU contains PDSCH] 958B
PDCCH DCI Format 0_1 on Scell [C_RNTI] 960A
Uplink Data on Scell [MAC PDU contains PDSCH] 960B
CRC status=PASS for UL PUSCH data for Pcell and Scell 962
Uplink data 964
Uplink data 966
CSI Report for Pcell and Scells [SNR>=10] 968
UL data decoding failed at gNB for Pcell and Scells 970
CSI Report for Pcell and Scells [SNR=5, 4, . . . ] 972
Channel condition getting worse 974
CSI Report for Pcell and Scells [SNR=4, 2, 1, 0, −1, . . . ] 976
PDCCH DCI Format 0_1 for Pcell and Scells [C_RNTI] 978
Uplink Data on Pcell and Scells [MAC PDU contains PUSCH] 980
CRC Status=FAIL for UL PUSCH because of low SNR for Pcell and Scells 982
Trigger/change additional DMRS configuration in UL DCI because of a condition for Pcell and Scells 984, where, in some examples, a condition can be UL SNR reporting is bad for a certain threshold and period; UL CRC fails because SNR is low (e.g., BLER is high for a certain threshold and period); UE is on a cell edge; and/or UE is on high mobility
Uplink data on Pcell and Scells 986
UE decodes new DCI received for UL direction for Pcell and Scells 987A
Trigger activation/deactivation of additional DMRS information DCI for Pcell 987B
Trigger activation/deactivation of additional DMRS information DCI for Scell 987C
Determine transport block (TB) for PDSCH by considering additional DMRS information for Pcell and Scells 987D
PDCCH DCI Format 0_1 on Pcell and Scells [C_RNTI] 988
Uplink data on Pcell and Scells [MAC PDU contains PUSCH] 990
CRC Status=PASS for UL PUSCH data for Pcell and Scells 992

Uplink data on Pcell 994A

Uplink data on Scells 994B

Uplink data 995

Improvement seen in CRC Pass for UL Data on Pcell and Scells 996

UL Data transfer continues 998

User equipment 902, gNB 904, 5GC 906, AMF 908, and UPF 910 can be similar to user equipment 802, gNB 804, 5GC 806, AMF 808, and UPF 810 of FIGS. 8A and 8B, respectively. Signals 912-950 can be similar to signals 812-850. Additionally, in signals 912-950, an IE dynamicAdditionalDmrsSupport can be available for downlink, and an uplink structure can be different relative to signals 812-850 of FIG. 8A.

Example Process Flows

Figure 10:
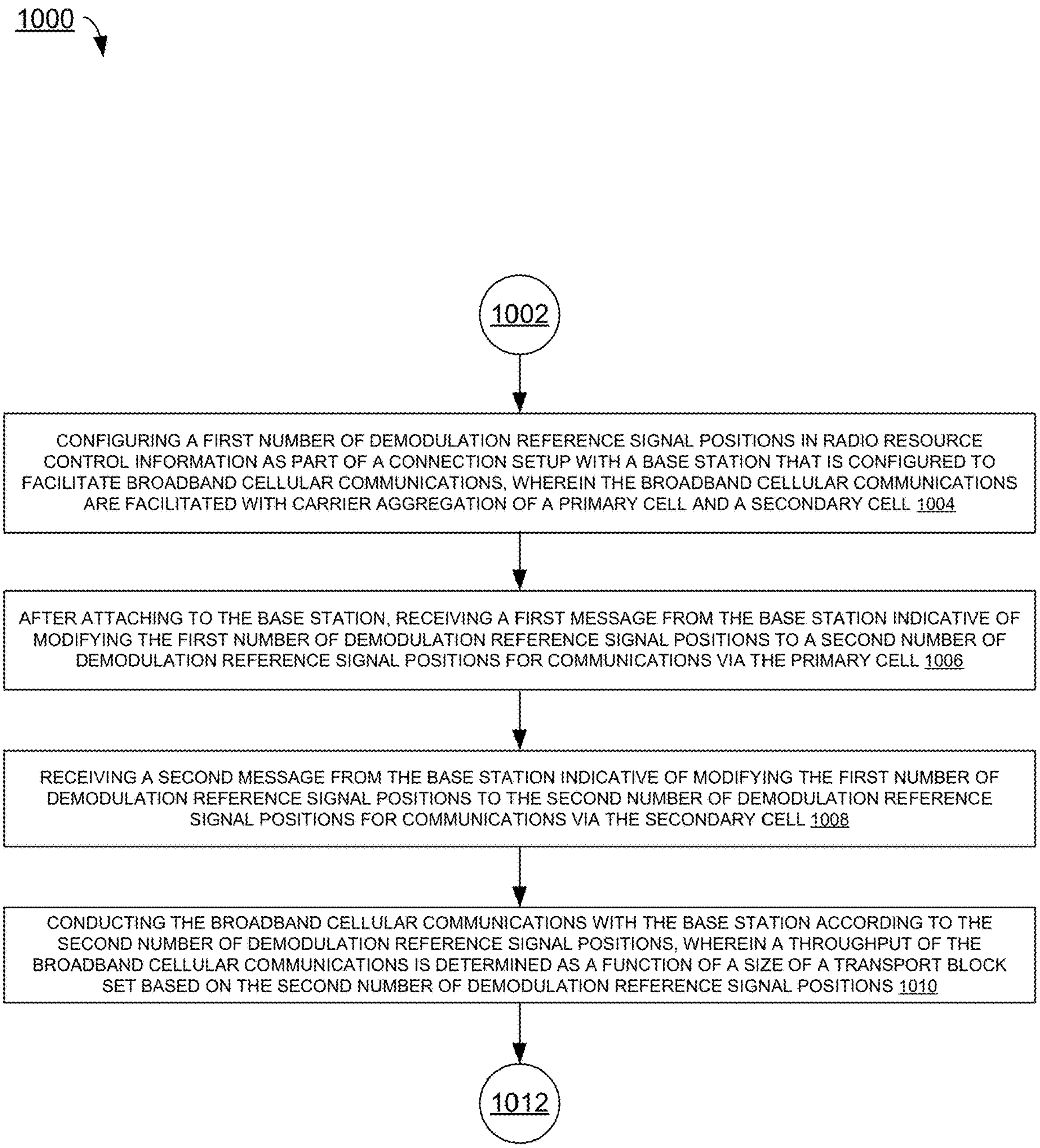
FIG. 10 illustrates an example process flow that can facilitate dynamic additional DMRS configuration, in accordance with an embodiment of this disclosure.

FIG. 10 illustrates an example process flow 1000 that can facilitate dynamic additional DMRS configuration, in accordance with an embodiment of this disclosure. In some examples, one or more embodiments of process flow 1000 can be implemented by UE 802 of FIGS. 8A and 8B, UE 902 of FIGS. 9A and 9B, and/or computing environment 1400 of FIG. 14.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

Process flow 1000 begins with 1002, and moves to operation 1004.

Operation 1004 depicts configuring a first number of demodulation reference signal positions in radio resource control information as part of a connection setup with a base station that is configured to facilitate broadband cellular communications, wherein the broadband cellular communications are facilitated with carrier aggregation of a primary cell and a secondary cell. This can comprise user equipment (e.g., UE 802 of FIGS. 8A and 8B) establishing a connection setup with a gNB (e.g., gNB 804 of FIGS. 8A and 8B), where the connection setup can be similar to NR RRC connection setup 812 and/or NR RRC connection setup 912. The first number of additional demodulation reference signal positions can be the number that are established as part of an attach procedure.

In some examples, operation 1004 comprises, as part of the attaching to the base station, receiving, from the base station, a radio resource control setup message that indicates that the base station supports modification of the first number of demodulation reference signal positions after attaching to the base station. That is, operation 1004 can comprise Msg4:RRCSetup (with dynamicAdditionalDmrsSupport[TRUE/FALSE] IE (in a downlink case, which can be similar to 826 of FIG. 8A), and/or Msg4:RRCSetup (with dynamicAdditionalDmrsSupport[TRUE/FALSE] IE (in an uplink case, which can be similar to 926 of FIG. 9A).

In some examples, an information element of the radio resource control setup message indicates that the base station supports the modification of the first number of demodulation reference signal positions after attaching to the base station. That is, an IE can be used to indicate the additional DMRS signal position support.

After operation 1004, process flow 1000 moves to operation 1006.

Operation 1006 depicts, after attaching to the base station, receiving a first message from the base station indicative of modifying the first number of demodulation reference signal positions to a second number of demodulation reference signal positions for communications via the primary cell. This message can be similar to Pcell and Scell PDCCH DCI format 1_1 886 (which can have an additional DMRS indicator field), and/or PDCCH DCI format 0_1 for Pcell and Scells [C-RNTI] 988F (which can have an additional DMRS indicator field), and received by user equipment.

This message can be received in response to trigger/change additional DMRS configuration in DL DCI because condition met for Pcell and/or Scells 882 of FIG. 8B (in a case of modifying additional DMRS configuration for downlink communications), or trigger/change additional DMRS configuration in UL DCI because of a condition for Pcell and/or Scells 984 of FIG. 9B (in a case of modifying additional DMRS configuration for uplink communication). Where modifying the additional DMRS positions is performed after UE attach where the number of additional DMRS positions is initially set, this can be a dynamic configuration.

In some examples, operation 1006 comprises, before receiving the message from the base station indicative of modifying the first number of demodulation reference signal positions, sending, to the base station, a user equipment capability message that indicates support for modification of the first number of demodulation reference signal positions after attaching to the base station. In some examples, this comprises user equipment sending a UE capability information (with dynamicAdditionalDmrsSupport[Supported] IE in FeatureSetDownlink and/or FeatureSetUplink), such as in 841B or 941B.

In some examples, an information element of the user equipment capability message indicates the support for the modification of the first number of demodulation reference signal positions after attaching to the base station. That is, an IE can be used to indicate the additional DMRS signal position support.

In some examples, operation 1006 comprises, before receiving the message from the base station indicative of modifying the first number of demodulation reference signal positions, receiving a radio resource control reconfiguration message that indicates that the base station supports modification of the first number of demodulation reference signal positions after attaching to the base station. In some examples, this comprises user equipment receiving a RRCReconfiguration with dynamicAdditionalDmrsSupport=TRUE in PDSCH-Config IE message (such as in 844 of FIG. 8A) or a RRCReconfiguration with dynamicAdditionalDmrsSupport=TRUE in PUSCH-Config IE message (such as in 944 of FIG. 9A).

In some examples, a physical downlink shared channel configuration information element of the radio resource control reconfiguration message indicates that the base station supports the modification of the first number of demodulation reference signal positions in downlink communications (such as in 844 of FIG. 8A). In some examples, a physical uplink shared channel configuration information element of the radio resource control reconfiguration message indicates that the base station supports the modification of the first number of demodulation reference signal positions in uplink communications (such as in 944 of FIG. 9A).

In some examples, the message from the base station indicative of modifying the first number of demodulation reference signal positions to the second number of demodulation reference signal positions comprises a downlink control information message in a 1_1 format, and the message indicates that the base station supports modification of the first number of demodulation reference signal positions in downlink communications. That is, the message can be similar to Pcell and Scell PDCCH DCI Format 1_1 [C_RNTI], as in 886 of FIG. 8B.

In some examples, the message from the base station indicative of modifying the first number of demodulation reference signal positions to the second number of demodulation reference signal positions comprises a downlink control information message in a 0_1 format, and the message indicates that the base station supports the modification of the first number of demodulation reference signal positions in uplink communications. That is, the message can be similar to PDCCH DCI Format 0_1 for Pcell and Scells [C-RNTI] 988F of FIG. 9B, where this has an additional DMRS indicator field.

In some examples, the first message comprises a downlink control information message. That is, downlink control information messages can be used to configure a number of additional DMRS positions. In some examples, an information element of the downlink control information message indicates modifying the first number of demodulation reference signal positions to the second number of demodulation reference signal positions. That is, it can be an IE of a DCI message that is used to convey information about configuring a number of additional DMRS positions.

In some examples, the downlink control information message is a first downlink control information message, and the second message (in operation 1008) comprises a second downlink control information message. That is, DCI messages can be used to configure additional DMRS positions with respect to both a primary cell and to secondary cells.

After operation 1006, process flow 1000 moves to operation 1008.

Operation 1008 depicts receiving a second message from the base station indicative of modifying the first number of demodulation reference signal positions to the second number of demodulation reference signal positions for communications via the secondary cell.

In some examples, this can comprise determining that a secondary cell is activated, and can be performed based on determining that downlink secondary cells activation procedure 851A of FIG. 8A or uplink secondary cells activation procedure 951A of FIG. 9A has been performed.

In some examples, a group of secondary cells that comprises the secondary cell is activated with respect to usage by the system. That is, it can be that multiple Scells are activated.

In some examples, the second message is indicative of modifying the first number of demodulation reference signal positions to the second number of demodulation reference signal positions for each secondary cell of the group of secondary cells. In some examples, each secondary cell of the group of secondary cells is configured to use a same number of demodulation reference signal positions. That is, when Scells are configured for additional DMRS signal positions, they can all be configured in the same way (among the Scells that have additional DMRS signal positions enabled).

In some examples, the group of secondary cells comprises a first subgroup of secondary cells for which additional demodulation reference signal positions are enabled, and a second subgroup of secondary cells for which the additional demodulation reference signal positions are not enabled, and the second message is indicative of modifying the first number of demodulation reference signal positions to the second number of demodulation reference signal positions for each secondary cell of the first subgroup of secondary cells, and further indicative of an absence of modifying the first number of demodulation reference signal positions to the second number of demodulation reference signal positions for each secondary cell of the second subgroup of secondary cells. That is, there can be some Scells for which additional DMRS signal positions are enabled (e.g., the first subgroup of secondary cells), and some Scells for which additional DMRS signal positions are not enabled (e.g., the second subgroup of secondary cells). In such examples, it can be that the number of additional DMRS signal positions are modified for the first subgroup of secondary cells, and not modified for the second subgroup of secondary cells.

After operation 1008, process flow 1000 moves to operation 1010.

Operation 1010 depicts conducting the broadband cellular communications with the base station according to the second number of demodulation reference signal positions, wherein a throughput of the broadband cellular communications is determined as a function of a size of a transport block set based on the second number of demodulation reference signal positions. This can comprise the user equipment using the dynamically configured additional DMRS positions, such as in DL data transfer continues on Pcell and Scells 896 of FIG. 8B (in a case of downlink communications), and/or UL data transfer continues 998 of FIG. 9B (in a case of uplink communications).

After operation 1010, process flow 1000 moves to 1012, where process flow 1000 ends.

Figure 11:
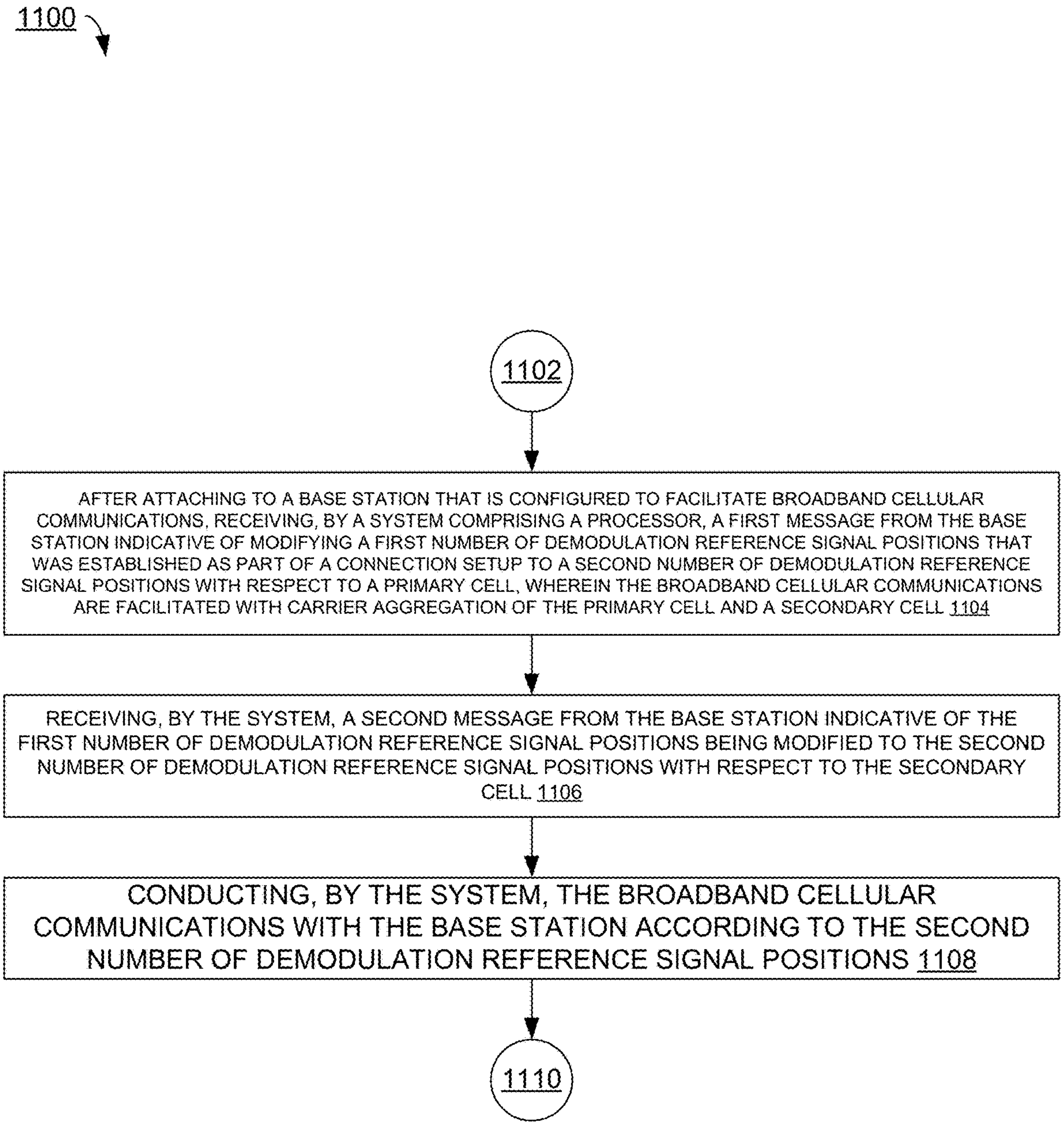
FIG. 11 illustrates another example process flow that can facilitate dynamic additional DMRS configuration, in accordance with an embodiment of this disclosure.

FIG. 11 illustrates an example process flow 1100 that can facilitate dynamic additional DMRS configuration, in accordance with an embodiment of this disclosure. In some examples, one or more embodiments of process flow 1100 can be implemented by UE 802 of FIGS. 8A and 8B, UE 902 of FIGS. 9A and 9B, and/or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts, after attaching to a base station that is configured to facilitate broadband cellular communications, receiving, by a system comprising a processor, a first message from the base station indicative of modifying a first number of demodulation reference signal positions that was established as part of a connection setup to a second number of demodulation reference signal positions with respect to a primary cell, wherein the broadband cellular communications are facilitated with carrier aggregation of the primary cell and a secondary cell. In some examples, operation 1104 can be implemented in a similar manner as operations 1004-1006 of FIG. 10.

In some examples, the second number of demodulation reference signal positions is configured for uplink communications of the broadband cellular communications, and the receiving the message from the base station is performed in response to sending uplink data to the base station. That is, the additional DMRS positions can be changed for uplink, and can a determination to change the additional DRMS positions can be made based on uplink data. This can be similar to the examples of FIGS. 10A-10B.

In some examples, the uplink data indicates that an uplink signal-to-noise ratio metric does not satisfy a threshold associated with a predetermined quality criterion for a defined amount of time, a cyclic redundancy check that corresponds to the uplink data has failed or is failing, the uplink data indicates that the system is connected to edge network equipment of a cellular network via which the broadband cellular communications are conducted, or the uplink data indicates that the system satisfies a defined physical movement criterion.

In some examples, when UL data transmission occurs, and a gNB determines that there are too many CRC failures, or a bad SNR, that can indicate that the corresponding UE is on a cell edge. A similar condition can occur in a case of high mobility. In such an example, where a UE is moving at a fast speed, and does not have a proper signal with the gNB, the CRC can fail at the gNB, and the SNR can be bad.

After operation 1104, process flow 1100 moves to operation 1106.

Operation 1106 depicts receiving, by the system, a second message from the base station indicative of the first number of demodulation reference signal positions being modified to the second number of demodulation reference signal positions with respect to the secondary cell. In some examples, operation 1106 can be implemented in a similar manner as operation 1008 of FIG. 10.

After operation 1106, process flow 1100 moves to operation 1108.

Operation 1108 depicts conducting the broadband cellular communications with the base station according to the second number of demodulation reference signal positions. In some examples, operation 1108 can be implemented in a similar manner as operation 1010 of FIG. 10.

After operation 1108, process flow 1100 moves to 1110, where process flow 1100 ends.

Figure 12:
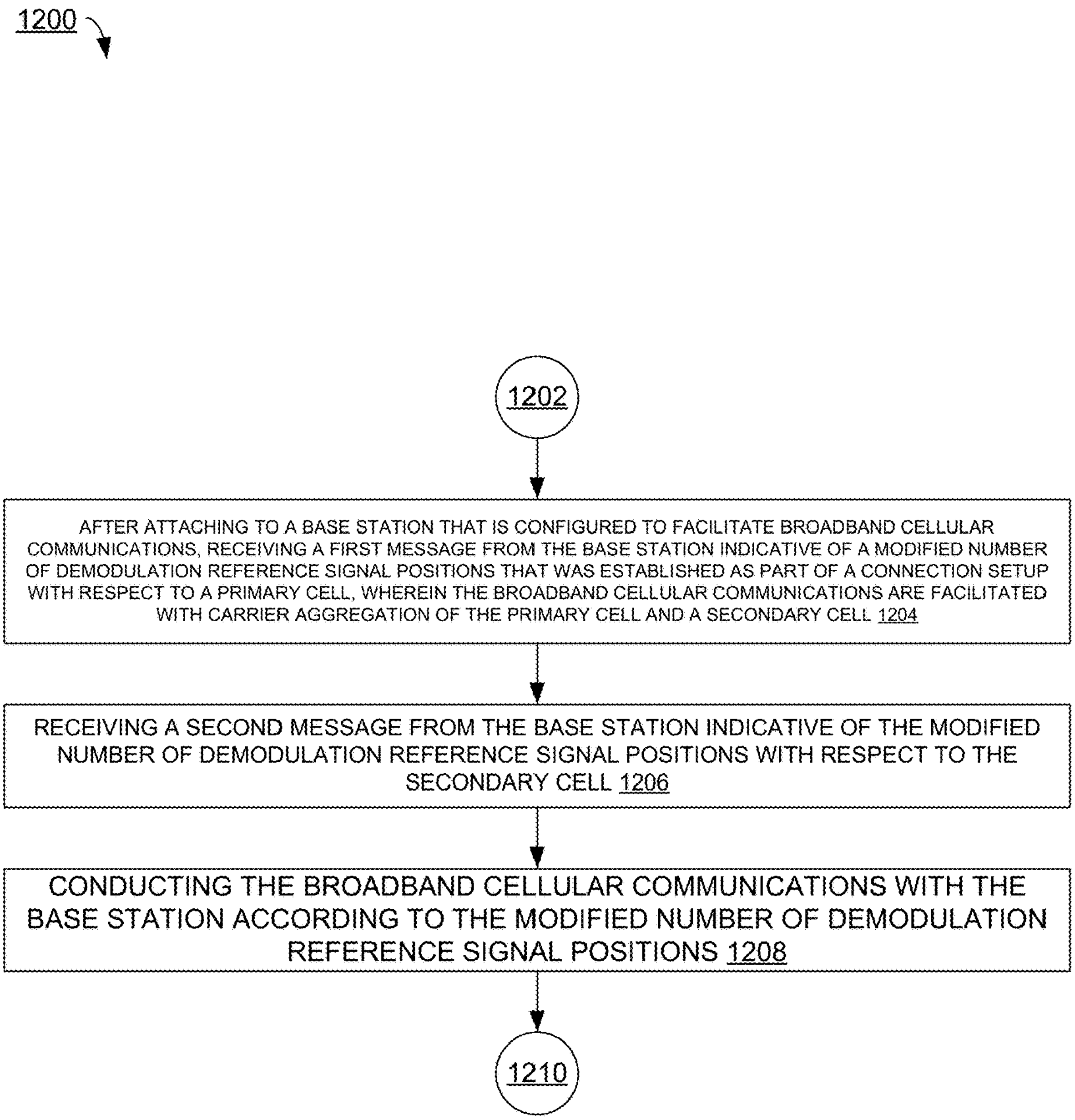
FIG. 12 illustrates another example process flow that can facilitate dynamic additional DMRS configuration, in accordance with an embodiment of this disclosure.

FIG. 12 illustrates an example process flow 1200 that can facilitate dynamic additional DMRS configuration, in accordance with an embodiment of this disclosure. In some examples, one or more embodiments of process flow 1200 can be implemented by UE 802 of FIGS. 8A and 8B, UE 902 of FIGS. 9A and 9B, and/or computing environment 1400 of FIG. 14.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11.

Process flow 1200 begins with 1202, and moves to operation 1204.

Operation 1204 depicts, after attaching to a base station that is configured to facilitate broadband cellular communications, receiving a first message from the base station indicative of a modified number of demodulation reference signal positions that was established as part of a connection setup with respect to a primary cell, wherein the broadband cellular communications are facilitated with carrier aggregation of the primary cell and a secondary cell. In some examples, operation 1204 can be implemented in a similar manner as operations 1004-1006 of FIG. 10.

In some examples, modifying the number of demodulation reference signal positions is performed for downlink communications of the broadband cellular communications, and the receiving the message from the base station is performed in response to sending downlink data to the base station. That is, the additional DMRS positions can be changed for downlink, and can a determination to change the additional DRMS positions can be made based on downlink data. This can be similar to the examples of FIGS. 8A-8B.

In some examples, modifying DL additional DMRS positions can be based on feedback received from UE for DL data. For example, if the HARQ feedback is NACK continuously, then that can indicate changing the DL DMRS positions. In another example, if the CQI reporting is bad, that can also indicate changing the DL DMRS positions.

In some examples, the downlink data indicates that a continuous quality improvement reporting metric does not satisfy a threshold associated with a defined threshold criterion for a defined amount of time. That is, CQI reporting can be bad for a certain quality threshold and time period.

In some examples, the downlink data indicates that hybrid automatic feedback is being reported as a negative acknowledgement. That is, HARQ feedback can be reported as NACK.

In some examples, the downlink data indicates that hybrid automatic feedback is being reported as the negative acknowledgement based on a block error rate metric satisfying a threshold associated with a defined threshold criterion for a defined amount of time. That is BLER can be high for a certain quality threshold and time period.

In some examples, the downlink data indicates that there is a connection to edge network equipment of a cellular network via which the first broadband cellular communications are conducted, or that a defined high mobility criterion is satisfied. That is, the UE can be on a cell edge, or be on high mobility.

For example, when DL data transmission occurs, and when a gNB receives too many HARQ feedback failures or low CQI reporting from the UE, that can indicate that the UE is on cell edge, so can lack enough power or signal conditions to send HARQ feedback as ACK.

The same can be applicable in the case of high mobility. Where a UE is moving at a very fast speed, and the UE does not have a proper signal, in that case the CRC can fail at the UE for DL data, and CQI reporting will be bad.

In some examples, the system comprises a base station, the modified number of demodulation reference signal positions is configured for uplink communications of the broadband cellular communications, and the receiving the first message from the base station is performed in response to sending uplink data to the base station.

In some examples, the uplink data indicates that an uplink signal-to-noise ratio metric does not satisfy a threshold associated with a predetermined quality criterion for a defined amount of time, a cyclic redundancy check that corresponds to the uplink data has failed or is failing, the uplink data indicates that the system is connected to edge network equipment of a cellular network via which the broadband cellular communications are conducted, or the uplink data indicates that the base station satisfies a defined physical movement criterion.

After operation 1204, process flow 1200 moves to operation 1206.

Operation 1206 depicts receiving a second message from the base station indicative of the modified number of demodulation reference signal positions with respect to the secondary cell. In some examples, operation 1206 can be implemented in a similar manner as operation 1008 of FIG. 10.

After operation 1206, process flow 1200 moves to operation 1208.

Operation 1208 depicts conducting broadband cellular communications with the base station according to the modified number of demodulation reference signal positions. In some examples, operation 1208 can be implemented in a similar manner as operation 1010 of FIG. 10.

In some examples, the broadband cellular communications are second broadband cellular communications, modifying the number of demodulation reference signal positions comprises modifying the number of demodulation reference signal positions from a first number of demodulation reference signal positions to a second number of demodulation reference signal positions, and a second throughput of the second broadband cellular communications is less than a first throughput of a first broadband cellular communication that is conducted according to the first number of demodulation reference signal positions. That is, data throughput (TP) can be inversely proportional to a number of configured additional DRMS positions. That is, where more additional DMRS symbols are configured, then data throughput can be lessened.

After operation 1208, process flow 1200 moves to 1210, where process flow 1200 ends.

Example Architecture

Figure 13:
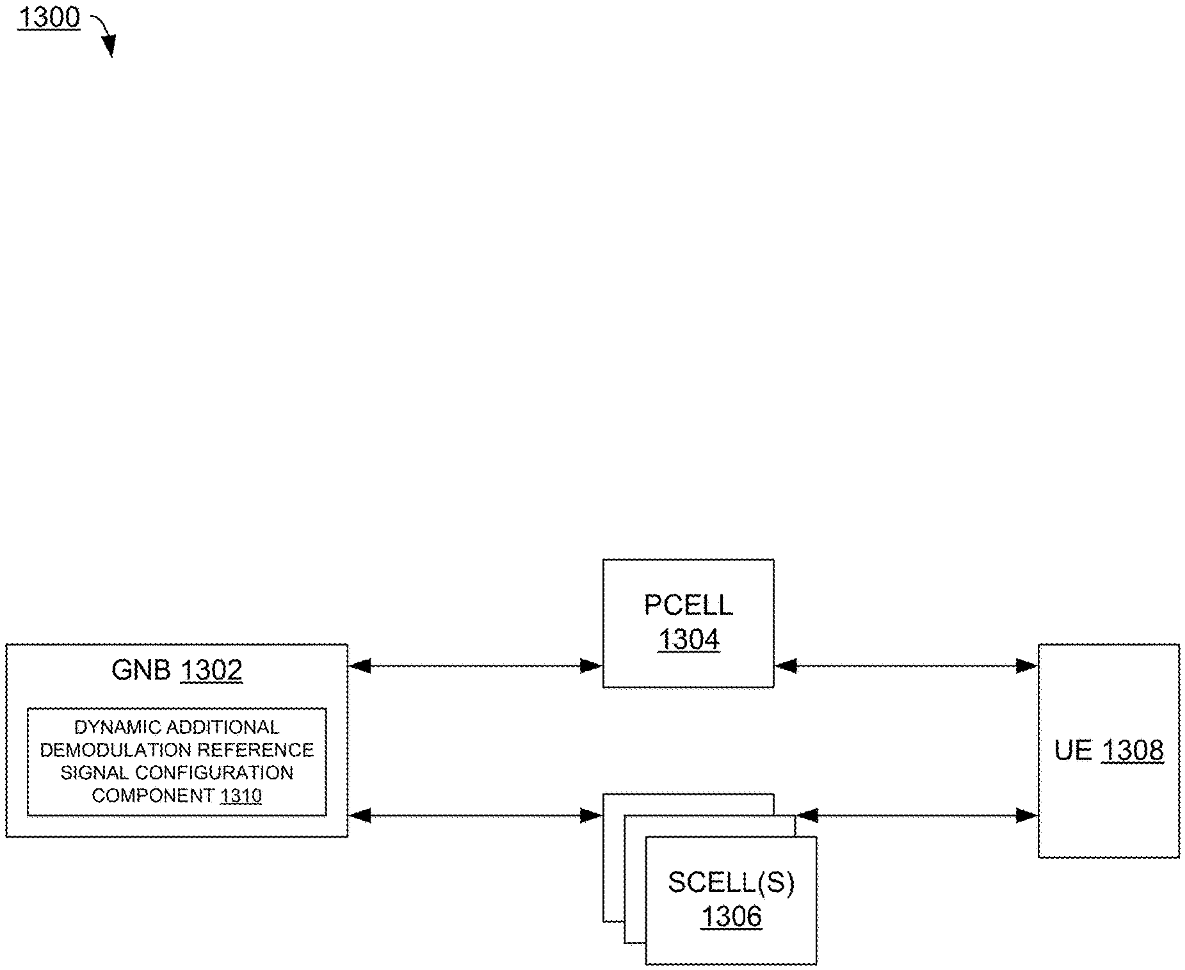
FIG. 13 illustrates an example system architecture that can facilitate dynamic additional DMRS configuration in accordance with an embodiment of this disclosure.

FIG. 13 illustrates an example system architecture 1300 that can facilitate dynamic additional DMRS configuration in accordance with an embodiment of this disclosure. In some examples, part(s) of system architecture can be used to implement the signal flows of FIGS. 8A, 8B, 9A, 9B, and/or the process flows of FIGS. 11-13.

As depicted, system architecture 1300 comprises gNB 1302, Pcell 1304, Scell(s) 1306, UE 1308, and dynamic additional demodulation reference signal configuration component 1310. In some examples, gNB 1302 can be similar to gNB 702 of FIG. 7, and UE 1308 can be similar to UE 704. Pcell 1304 can be a Pcell as described herein, and that is communicatively coupled to both gNB 1302 and UE 1308. Similarly, Scell(s) 1306 can be one or more Scells as described herein, and that are communicatively coupled to both gNB 1302 and UE 1308.

Dynamic additional demodulation reference signal configuration component 1310 can comprise a component of gNB 1302 that facilitates dynamic additional demodulation reference signal configuration as described herein, and can do so in a scenario where carrier aggregation of Pcell 1304 and Scell(s) 1306 is enabled.

Example Operating Environment

Figure 14:
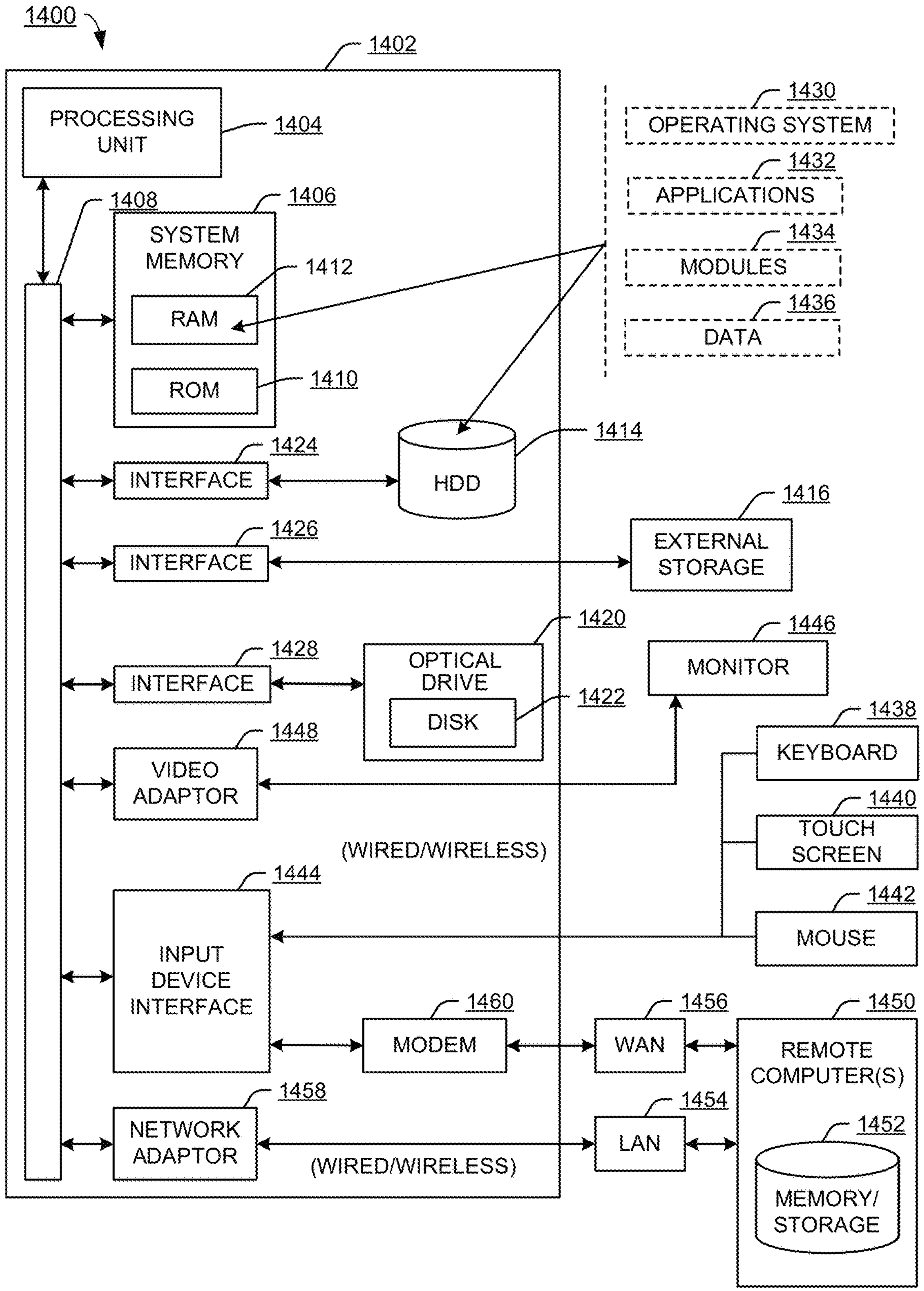
FIG. 14 illustrates an example block diagram of a computer operable to execute an embodiment of this disclosure.

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of dynamic additional DMRS configuration component 310 of FIGS. 3A and 3B; dynamic additional DMRS configuration component 410 of FIGS. 4A and 4B; dynamic additional DMRS configuration component 510 of FIGS. 5A and 5B; dynamic additional DMRS configuration component 610 of FIGS. 6A and 6B; gNB 702 and/or UE 704 of FIG. 7; UE 802, gNB 804, and/or 5GC 806 of FIGS. 8A and 8B; and/or UE 902, gNB 904, and/or 5GC 906 of FIGS. 9A and 9B.

In some examples, computing environment 1400 can implement one or more embodiments of the process flows of FIGS. 10-12 to facilitate dynamic additional DMRS configuration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 (containing disk 1422) can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450) can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface." "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory coupled to the at least one processor, comprising instructions that cause the at least one processor to perform operations comprising:

configuring a first number of demodulation reference signal positions in radio resource control information as part of a connection setup with a base station that is configured to facilitate broadband cellular communications, wherein the broadband cellular communications are facilitated with carrier aggregation of a primary cell and a secondary cell into a master cell group, wherein the carrier aggregation comprises combining respective bandwidth of the primary cell and the secondary cell into a combined bandwidth that is utilized by the system, wherein the system initially registers with the master cell group that comprises the primary cell and the secondary cell, wherein the primary cell comprises a first device, and wherein the secondary cell comprises a second device;

after attaching to the base station, receiving a first message from the base station indicative of modifying the first number of demodulation reference signal positions to a second number of demodulation reference signal positions for communications via the primary cell;

receiving a second message from the base station indicative of modifying the first number of demodulation reference signal positions to the second number of demodulation reference signal positions for communications via the secondary cell; and conducting the broadband cellular communications with the base station according to the second number of demodulation reference signal positions, wherein a throughput of the broadband cellular communications is determined as a function of a size of a transport block set based on the second number of demodulation reference signal positions.

2. The system of claim 1, wherein a group of secondary cells that comprises the secondary cell is activated with respect to the system.

3. The system of claim 2, wherein the second message is indicative of modifying the first number of demodulation reference signal positions to the second number of demodulation reference signal positions for each secondary cell of the group of secondary cells.

4. The system of claim 2, wherein each secondary cell of the group of secondary cells is configured to use a same number of demodulation reference signal positions.

5. The system of claim 2, wherein the group of secondary cells comprises a first subgroup of secondary cells for which additional demodulation reference signal positions are enabled, and a second subgroup of secondary cells for which the additional demodulation reference signal positions are not enabled, and wherein the second message is indicative of modifying the first number of demodulation reference signal positions to the second number of demodulation reference signal positions for each secondary cell of the first subgroup of secondary cells, and further indicative of an absence of modifying the first number of demodulation reference signal positions to the second number of demodulation reference signal positions for each secondary cell of the second subgroup of secondary cells.

6. The system of claim 2, wherein the second message is configured according to a first format in response to a number of secondary cells in the group of secondary cells that comprises the secondary cell being determined to be less than or equal to a threshold applicable to secondary cells.

7. The system of claim 6, the second message is configured according to a second format in response to the number of secondary cells in the group of secondary cells that comprises the secondary cell being determined to be greater than the threshold.

8. The system of claim 7, wherein the threshold is a first threshold, and wherein configuring the second message according to the second format is performed in response to the number of secondary cells being determined to be less than or equal to a second threshold.

9. A method, comprising:

after attaching to a base station that is configured to facilitate broadband cellular communications, receiving, by a system comprising at least one processor, a first message from the base station indicative of modifying a first number of demodulation reference signal positions that was established as part of a connection setup to a second number of demodulation reference signal positions with respect to a primary cell, wherein the broadband cellular communications are facilitated with carrier aggregation of the primary cell and a secondary cell, wherein the carrier aggregation comprises combining respective bandwidth of the primary cell and the secondary cell into a combined bandwidth that is utilized by the system, wherein the primary cell comprises a first device, and wherein the secondary cell comprises a second device;

receiving, by the system, a second message from the base station indicative of the first number of demodulation reference signal positions being modified to the second number of demodulation reference signal positions with respect to the secondary cell; and conducting, by the system, the broadband cellular communications with the base station according to the second number of demodulation reference signal positions.

10. The method of claim 9, further comprising:

as part of the attaching to the base station, receiving, by the system and from the base station, a radio resource control setup message that indicates that the base station supports modification of the first number of demodulation reference signal positions after attaching to the base station.

11. The method of claim 10, wherein an information element of the radio resource control setup message indicates that the base station supports the modification of the first number of demodulation reference signal positions after attaching to the base station.

12. The method of claim 9, further comprising:

before receiving the first message from the base station indicative of modifying the first number of demodulation reference signal positions, sending, by the system and to the base station, a user equipment capability message that indicates support for modification of the first number of demodulation reference signal positions after attaching to the base station.

13. The method of claim 12, wherein an information element of the user equipment capability message indicates the support for the modification of the first number of demodulation reference signal positions after attaching the to the base station.

14. The method of claim 9, further comprising:

before receiving the first message from the base station indicative of modifying the first number of demodulation reference signal positions, receiving, by the system, a radio resource control reconfiguration message that indicates that the base station supports modification of the first number of demodulation reference signal positions after attaching to the base station.

15. A non-transitory computer-readable medium comprising instructions that, in response to execution, cause a system comprising a processor to perform operations, comprising:

after attaching to a base station that is configured to facilitate broadband cellular communications, receiving a first message from the base station indicative of a modified number of demodulation reference signal positions that was established as part of a connection setup with respect to a primary cell, wherein the broadband cellular communications are facilitated with carrier aggregation of the primary cell and a secondary cell into a master cell group, and wherein the system initially registers with the master cell group that comprises the primary cell and the secondary cell;

receiving a second message from the base station indicative of the modified number of demodulation reference signal positions with respect to the secondary cell; and conducting the broadband cellular communications with the base station according to the modified number of demodulation reference signal positions.

16. The non-transitory computer-readable medium of claim 15, wherein the first message from the base station indicative of the modified number of demodulation reference signal positions comprises a downlink control information message in a 1_1 format, and wherein the first message indicates that the base station supports modifying demodulation reference signal positions in downlink communications.

17. The non-transitory computer-readable medium of claim 15, wherein the first message from the base station indicative of the modified number of demodulation reference signal positions comprises a downlink control information message in a 0_1 format, and wherein the first message indicates that the base station supports modification of demodulation reference signal positions in uplink communications.

18. The non-transitory computer-readable medium of claim 15, wherein the modified number of demodulation reference signal positions is configured for uplink communications of the broadband cellular communications, and wherein the receiving the first message from the base station is performed in response to sending uplink data to the base station.

19. The non-transitory computer-readable medium of claim 18, wherein the uplink data indicates that an uplink signal-to-noise ratio metric does not satisfy a threshold associated with a predetermined quality criterion for a defined amount of time, wherein a cyclic redundancy check that corresponds to the uplink data has failed or is failing, wherein the uplink data indicates that the system is connected to edge network equipment of a cellular network via which the broadband cellular communications are conducted, or wherein the uplink data indicates that the system satisfies a defined physical movement criterion.

20. The non-transitory computer-readable medium of claim 15, wherein the modified number of demodulation reference signal positions is applicable for downlink communications of the broadband cellular communications, and wherein the receiving the first message from the base station is performed in response to sending downlink data to the base station.

* * * * *